United States Patent
Inoshita et al.

(10) Patent No.: US 10,378,467 B2
(45) Date of Patent: Aug. 13, 2019

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Kenji Inoshita, Okazaki (JP); Shuntaro Okazaki, Shizuoka-ken (JP); Yuji Miyoshi, Susono (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 239 days.

(21) Appl. No.: 15/639,043

(22) Filed: Jun. 30, 2017

(65) Prior Publication Data

US 2018/0010539 A1 Jan. 11, 2018

(30) Foreign Application Priority Data

Jul. 6, 2016 (JP) ................................. 2016-134235

(51) Int. Cl.
*F02D 41/14* (2006.01)
*F01N 3/28* (2006.01)
(Continued)

(52) U.S. Cl.
CPC ....... *F02D 41/1454* (2013.01); *F01N 3/2892* (2013.01); *F01N 9/00* (2013.01);
(Continued)

(58) Field of Classification Search
CPC ...... F02D 41/14; F02D 41/02; F02D 41/1454; F02D 41/1441; F02D 41/1445;
(Continued)

(56) References Cited

U.S. PATENT DOCUMENTS

2002/0038544 A1* 4/2002 Ikemoto ................ F02D 41/123
60/285
2004/0006971 A1* 1/2004 Kamoto .................. F01N 3/101
60/277
(Continued)

FOREIGN PATENT DOCUMENTS

JP 2003-301717 A 10/2003
JP 2003301717 A * 10/2003
(Continued)

*Primary Examiner* — Patrick D Maines
(74) *Attorney, Agent, or Firm* — Hunton Andrews Kurth LLP

(57) ABSTRACT

A control device for an internal combustion engine is provided with a target air-fuel ratio setting part including a first setting control part performing normal control alternately switching a target air-fuel ratio between a predetermined first lean air-fuel ratio and a predetermined first rich air-fuel ratio and a second setting control part performing control for restoration of the storage amount stopping normal control and increasing the oxygen storage amount of a second catalyst when an output air-fuel ratio of a third air-fuel ratio sensor becomes a predetermined rich judgment air-fuel ratio or less. Further, the second setting control part is configured to set the target air-fuel ratio to a predetermined second lean air-fuel ratio larger than the first lean air-fuel ratio at the time of start of the control for restoration of the storage amount and set the target air-fuel ratio to a predetermined third lean air-fuel ratio smaller than the second lean air-fuel ratio after an exhaust with a larger air-fuel ratio than the stoichiometric air-fuel ratio flows out from the first catalyst in the time period of setting the target air-fuel ratio to the second lean air-fuel ratio.

9 Claims, 11 Drawing Sheets

(51) Int. Cl.
*F01N 11/00* (2006.01)
*F02D 41/02* (2006.01)
*F01N 9/00* (2006.01)

(52) U.S. Cl.
CPC ........ *F01N 11/007* (2013.01); *F02D 41/0295* (2013.01); *F02D 41/1441* (2013.01); *F02D 41/1445* (2013.01); *F02D 41/1475* (2013.01); *F01N 2430/06* (2013.01); *F01N 2560/025* (2013.01); *F01N 2560/14* (2013.01); *F01N 2900/1624* (2013.01); *F02D 2200/0814* (2013.01); *Y02T 10/47* (2013.01)

(58) Field of Classification Search
CPC ......... F02D 41/0295; F02D 2200/0814; F01N 11/00; F01N 3/28; F01N 3/2892; F01N 11/007
See application file for complete search history.

(56) References Cited

U.S. PATENT DOCUMENTS

| | | | | |
|---|---|---|---|---|
| 2007/0113538 | A1* | 5/2007 | Kato | ............... F01N 3/0864 60/276 |
| 2015/0322878 | A1 | 11/2015 | Okazaki et al. | |
| 2018/0023437 | A1* | 1/2018 | Suzuki | ............... F01N 3/101 60/274 |

FOREIGN PATENT DOCUMENTS

| | | | |
|---|---|---|---|
| JP | 2005-299430 A | | 10/2005 |
| JP | 2018003777 A | * | 1/2018 |
| WO | 2014/118890 A1 | | 8/2014 |

* cited by examiner

CONTROL DEVICE FOR INTERNAL COMBUSTION ENGINE

CROSS-REFERENCE TO RELATED APPLICATION

This application claims priority based on Japanese Patent Application No. 2016-134235 filed with the Japan Patent Office on Jul. 6, 2016, the entire contents of which are incorporated into the present specification by reference.

TECHNICAL FIELD

The present disclosure relates to a control device for an internal combustion engine.

BACKGROUND ART

JP2005-299430A discloses an internal combustion engine comprising a first catalyst arranged in an exhaust passage of an engine body and having an oxygen storage ability, a second catalyst arranged in the exhaust passage at the downstream side from the first catalyst and having an oxygen storage ability, a first exhaust sensor (air-fuel ratio sensor) arranged at an upstream side of the first catalyst, a second exhaust sensor (oxygen sensor) arranged between the first catalyst and the second catalyst, and a third exhaust sensor (oxygen sensor) arranged at the downstream side of the second catalyst.

Further, this patent literature discloses a control device of this internal combustion engine controlling the engine body so that the air-fuel ratio of the exhaust detected by the first exhaust sensor becomes a target air-fuel ratio, switching the target air-fuel ratio to a rich air-fuel ratio when judging based on the detection value of the second exhaust sensor that lean air-fuel ratio exhaust is flowing out from the first catalyst, and conversely switching the target air-fuel ratio to a lean air-fuel ratio when judging that rich air-fuel ratio exhaust is flowing out. Further, it discloses to judge that the oxygen storage amount of the second catalyst is near zero when judging based on the detection value of the third exhaust sensor that rich air-fuel ratio exhaust is flowing out from the second catalyst and to correct the target air-fuel ratio so that the target air-fuel ratio becomes larger than normal so as to restore the second catalyst storage amount.

SUMMARY OF THE DISCLOSURE

In this way, the control device for internal combustion engine described in the patent literature switched the target air-fuel ratio to the lean air-fuel ratio or the rich air-fuel ratio based on the detection value of the second exhaust sensor. For this reason, even if correcting the target air-fuel ratio to become larger than normal based on the detection value of the third exhaust sensor, if it is judged based on the detection value of the second exhaust sensor that lean air-fuel ratio exhaust is flowing out from the first catalyst, the target air-fuel ratio is switched to the rich air-fuel ratio. As a result, the target air-fuel ratio is switched to the rich air-fuel ratio before the oxygen storage amount of the second catalyst is sufficiently restored, so when rich air-fuel ratio exhaust flows out from the first catalyst, the unburned gas contained in the exhaust cannot be removed by oxidation by the second catalyst and the exhaust emission is liable to deteriorate.

The present disclosure was made focusing on this problem and has as its object to suppress the deterioration of the exhaust emission occurring when the oxygen storage amount of the second catalyst is not sufficient.

To solve this problem, according to one aspect of the present disclosure, there is provided a control device for an internal combustion engine for controlling an internal combustion engine provided with an engine body, a first catalyst arranged in an exhaust passage of the engine body and having an oxygen storage ability, a second catalyst arranged in the exhaust passage at the further downstream side in the direction of flow of exhaust from the first catalyst and having an oxygen storage ability, a first air-fuel ratio sensor arranged in the exhaust passage at the further upstream side in the direction of flow of exhaust from the first catalyst for detecting an air-fuel ratio of the exhaust flowing into the first catalyst, a second air-fuel ratio sensor arranged in the exhaust passage between the first catalyst and the second catalyst for detecting an air-fuel ratio of the exhaust flowing out from the first catalyst, and a third air-fuel ratio sensor arranged in the exhaust passage at a further downstream side in the direction of flow of exhaust of the second catalyst for detecting an air-fuel ratio of the exhaust flowing out from the second catalyst, the control device comprising an air-fuel ratio control part configured to control an air-fuel ratio of the exhaust discharged from the engine body so that the output air-fuel ratio of the first air-fuel ratio sensor becomes a target air-fuel ratio and a target air-fuel ratio setting part configured to set a target air-fuel ratio. The target air-fuel ratio setting part comprises a first setting control part configured to perform normal control alternately switching the target air-fuel ratio between a predetermined first lean air-fuel ratio larger than a stoichiometric air-fuel ratio and a predetermined first rich air-fuel ratio smaller than the stoichiometric air-fuel ratio and a second setting control part configured to perform control for restoration of the storage amount stopping normal control and increasing the oxygen storage amount of the second catalyst when the output air-fuel ratio of the third air-fuel ratio sensor becomes a predetermined rich judgment air-fuel ratio smaller than the stoichiometric air-fuel ratio and larger than the first rich air-fuel ratio or becomes less. Further, the second setting control part is configured to set the target air-fuel ratio at a predetermined second lean air-fuel ratio larger than the first lean air-fuel ratio when starting control for restoration of the storage amount and to set the target air-fuel ratio to a predetermined third lean air-fuel ratio smaller than the second lean air-fuel ratio after exhaust larger in air-fuel ratio than the stoichiometric air-fuel ratio flows out from the first catalyst in the time period when setting the target air-fuel ratio to the second lean air-fuel ratio.

According to this aspect of the present disclosure, it is possible to suitably restore the oxygen storage amount of the second catalyst, so it is possible to suppress deterioration of the exhaust emission occurring in the case where the oxygen storage amount of the second catalyst is not sufficient.

DESCRIPTION OF EMBODIMENTS

Figure 1:
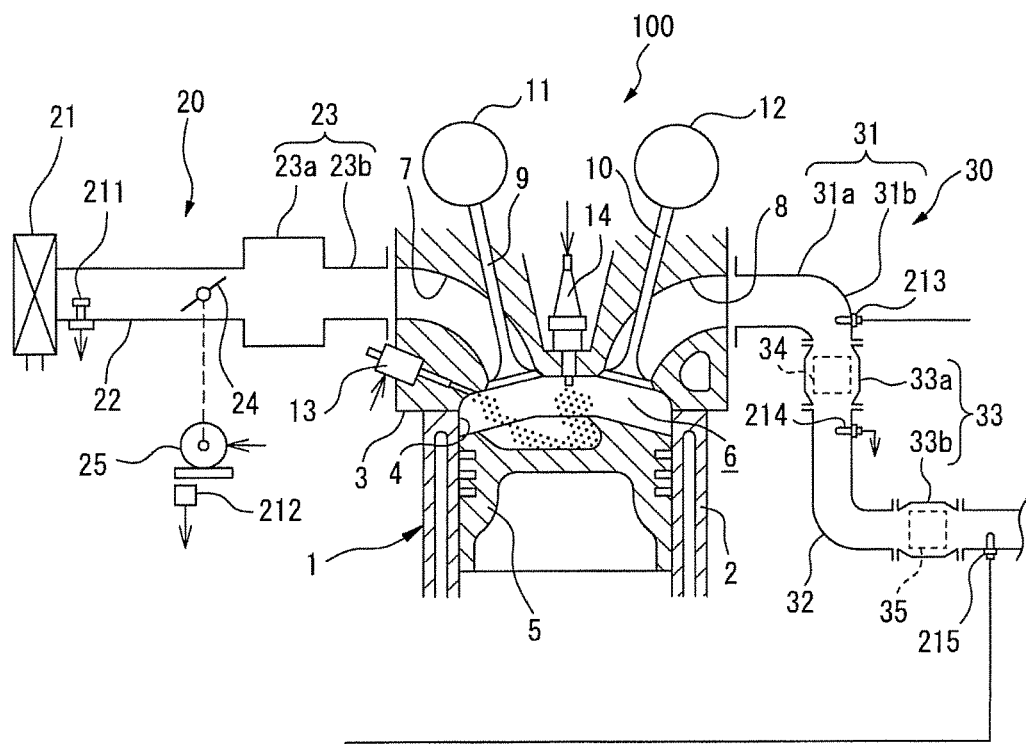
FIG. 1 is a view of the general configuration of an internal combustion engine and an electronic control unit controlling the internal combustion engine according to a first embodiment of the present invention.
Figure 1:
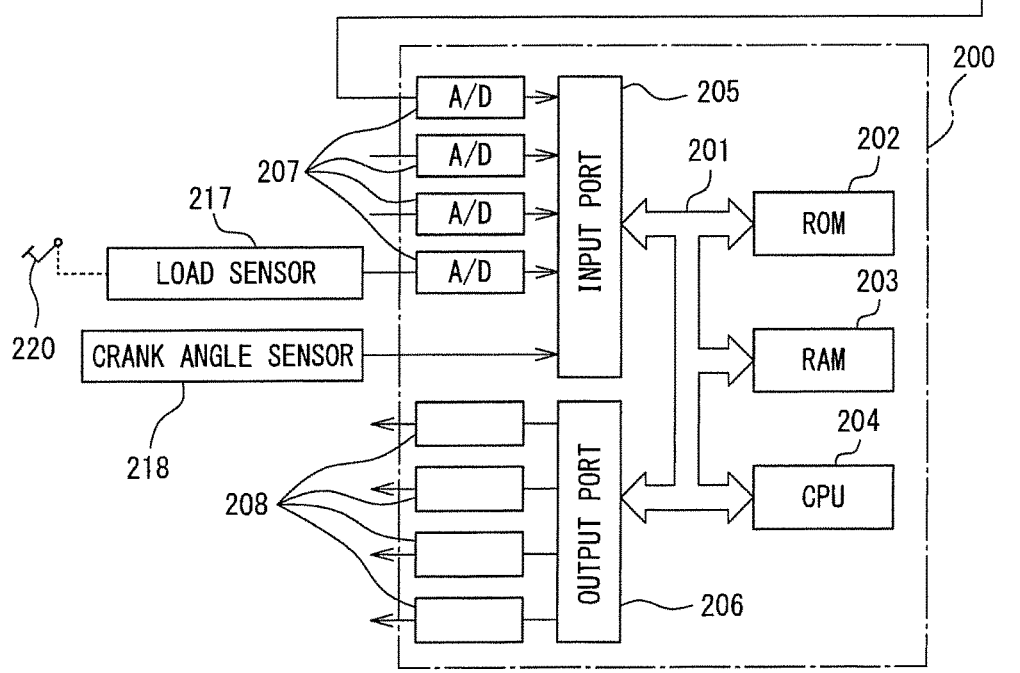

Below, referring to the drawings, embodiments of the present invention will be explained in detail. Note that, in the following explanation, similar components are assigned the same reference numerals.

First Embodiment

Explanation of Internal Combustion Engine as a Whole

First, referring to FIG. 1 to FIG. 5, an internal combustion engine 100 and an electronic control unit 200 controlling the internal combustion engine 100 according to a first embodiment of the present invention will be explained. FIG. 1 is a view of the general configuration of the internal combustion engine 100 and the electronic control unit 200 controlling the internal combustion engine 100 according to an embodiment of the present invention.

As shown in FIG. 1, the internal combustion engine 100 is provided with an engine body 1, intake device 20, and exhaust device 30.

The engine body 1 is provided with a cylinder block 2 and a cylinder head 3 fixed to the top surface of the cylinder block 2.

The cylinder block 2 is formed with a plurality of cylinders 4. Inside of the cylinders 4, pistons 5 which receive the combustion pressure and move back and forth inside of the cylinders 4 are housed. The pistons 5 are connected through connecting rods to a crankshaft. Due to the crankshaft, back and forth motions of the pistons 5 are converted to rotary motion. The spaces defined by the inside wall surface of the cylinder head 3, the inside wall surfaces of the cylinders 4, and the top faces of the pistons form combustion chambers 6.

The cylinder head 3 is formed with intake ports 7 which open to one side surface of the cylinder head 3 and open to the combustion chambers 6 and exhaust ports 8 which open to the other side surface of the cylinder head 3 and open to the combustion chambers 6.

Further, the cylinder head 3 has intake valves 9 for opening and closing the openings between the combustion chambers 6 and intake ports 7, exhaust valves 10 for opening and closing the openings between the combustion chambers 6 and exhaust ports 8, an intake camshaft 11 driving the operation of the intake valves 9, and an exhaust camshaft 12 driving the operation of the exhaust valves 10.

Furthermore, the cylinder head 3 has attached to it fuel injectors 13 for injecting fuel into the combustion chambers 6 and spark plugs 14 for igniting the air-fuel mixture of the fuel and air injected from the fuel injectors 13 inside the combustion chambers 6. In the present embodiment, as the fuel, gasoline with a stoichiometric air-fuel ratio of 14.6 was used, but another fuel can also be used. Note that, the fuel injectors 13 may also be attached to inject fuel into the intake ports 7.

The intake device 20 is a device for guiding air through the intake ports 7 to the insides of the cylinders 4 and is provided with an air cleaner 21, intake pipe 22, intake manifold 23, electronically controlled throttle valve 24, and air flow meter 211.

The air cleaner 21 removes sand and other foreign matter contained in the air.

The intake pipe 22 is connected at one end to the air cleaner 21 and is connected at the other end to a surge tank 23a of the intake manifold 23. Due to the intake pipe 22, air (intake air) flowing through the air cleaner 21 to the inside of the intake pipe 22 is guided to the surge tank 23a of the intake manifold 23.

The intake manifold 23 is provided with the surge tank 23a and a plurality of intake runners 23b branching from the surge tank 23a and connecting to openings of the intake ports 7 formed at the side surface of the cylinder head. The air guided to the surge tank 23a is evenly distributed to the insides of the cylinders 4 through the intake runners 23b. In this way, the intake pipe 22, intake manifold 23, and intake ports 7 form intake passages for guiding air to the cylinders 4.

The throttle valve 24 is provided inside the intake pipe 22. The throttle valve 24 is driven by a throttle actuator 25 and changes the passage cross-sectional area of the intake pipe 22 continuously or in stages. By using the throttle actuator 25 to adjust the opening degree of the throttle valve 24 (below, referred to as the "throttle opening degree"), the amounts of intake air taken into the cylinders 4 are adjusted. The throttle opening degree is detected by a throttle sensor 212.

The air flow meter 211 is provided inside the intake pipe 22 at the upstream side from the throttle valve 24. The air flow meter 211 detects the amount of flow of the air flowing through the inside of the intake pipe 22 (below, referred to as the "intake amount").

The exhaust device 30 is a device for purifying combustion gas (exhaust) produced inside the combustion chambers 6 and discharging it to the outside air and is provided with an exhaust manifold 31, exhaust pipe 32, exhaust post-treatment device 33, first air-fuel ratio sensor 213, second air-fuel ratio sensor 214, and third air-fuel ratio sensor 215.

The exhaust manifold 31 is provided with a plurality of exhaust runners 31a connected with openings of the exhaust ports 8 formed at a side surface of the cylinder head and a header pipe 31b collecting the exhaust runners 31a into a single pipe.

The exhaust pipe 32 is connected at one end to the header pipe 31b of the exhaust manifold 31 and opens at the other end to the outside air. The exhaust discharged from the cylinders 4 through the exhaust ports 8 to the exhaust manifold 31 flows through the exhaust pipe 32 to be discharged to the outside air.

The exhaust post-treatment device 33 is provided with a first catalytic converter 33a and a second catalytic converter 33b respectively housing exhaust purification catalysts. The catalytic converters are connected with the exhaust pipe 32 in the order of the first catalytic converter 33a and second catalytic converter 33b at the upstream side in the direction of flow of exhaust. In this way, the exhaust ports 8, exhaust manifold 31, exhaust pipe 32, first catalytic converter 33a, and second catalytic converter 33b form the exhaust passages through which exhaust discharged from the cylinders 4 flows.

The first catalytic converter 33a and second catalytic converter 33b house three-way catalysts having oxygen storage abilities as exhaust purification catalysts. Note that, in the following explanation, when it is necessary to particularly differentiate between the three-way catalysts housed in the first catalytic converter 33a and second catalytic converter 33b, the three-way catalyst housed in the first catalytic converter 33a will be referred to as the "first three-way catalyst 34" while the three-way catalyst housed in the second catalytic converter 33b will be referred to as the "second three-way catalyst 35".

The three-way catalyst is comprised of a support comprised of ceramic at which a precious metal having a catalytic action (for example, platinum (Pt)) and a substance having an oxygen storage ability (for example, ceria ($CeO_2$)) are supported. When the three-way catalyst reaches a predetermined activation temperature, in addition to a catalytic action simultaneously removing unburned gases (HC, CO, etc.) and nitrogen oxides ($NO_X$), it exhibits an oxygen storage ability. Note that in the present embodiment, the term "storage" is used as a term including both absorption and adsorption.

The three-way catalyst having an oxygen storage ability stores the oxygen in the exhaust when the air-fuel ratio of the exhaust flowing into the three-way catalyst is larger than the stoichiometric air-fuel ratio, that is, when the air-fuel ratio of the exhaust flowing into the three-way catalyst is a lean air-fuel ratio leaner than the stoichiometric air-fuel ratio. On the other hand, when the air-fuel ratio of the exhaust flowing into the three-way catalyst is smaller than the stoichiometric air-fuel ratio, that is, when the air-fuel ratio of the exhaust flowing into the three-way catalyst is a rich air-fuel ratio richer than the stoichiometric air-fuel ratio, the oxygen stored in the three-way catalyst is released. Further, when the air-fuel ratio of the exhaust flowing into the three-way catalyst is a rich air-fuel ratio, in the three-way catalyst, ammonia is generated due to the nitrogen and hydrogen or HC and $NO_X$ in the exhaust reacting.

Figure 2A:
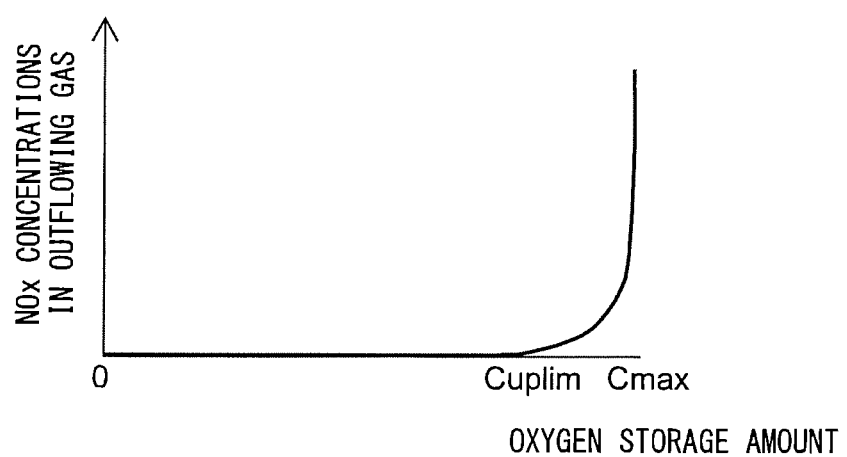
FIGS. 2A and 2B are views showing a relationship between an oxygen storage amount of an exhaust purification catalyst and an $NO_X$ concentration or HC, CO concentration in exhaust gas flowing out from the exhaust purification catalyst.

The three-way catalyst has a catalytic action and an oxygen storage ability and thereby has the action of removing $NO_X$ and unburned gas corresponding to the oxygen storage amount. That is, when the air-fuel ratio of the exhaust flowing into the three-way catalyst is the lean air-fuel ratio, as shown in FIG. 2A, when the oxygen storage amount is small, the three-way catalyst stores the oxygen in the exhaust. Further, along with this, the $NO_X$ in the exhaust is removed by reduction. Further, if the oxygen storage amount becomes greater, the concentrations of oxygen and $NO_X$ in the exhaust flowing out from the three-way catalyst rapidly rise starting from a certain storage amount (Cuplim in the figure) near the maximum storage amount Cmax.

Figure 2B:
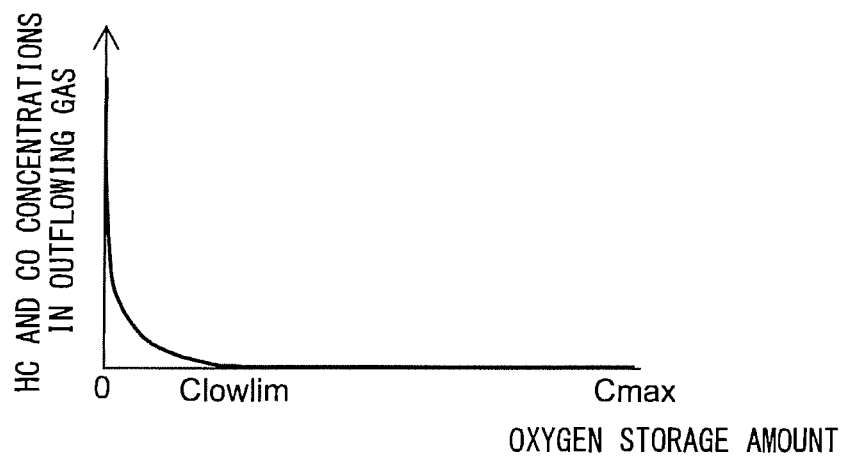

On the other hand, when the air-fuel ratio of the exhaust flowing into the three-way catalyst is a rich air-fuel ratio, as shown in FIG. 2B, when the oxygen storage amount is large, the oxygen stored in the three-way catalyst is released and the unburned gas in the exhaust is removed by oxidation. Further, if the oxygen storage amount becomes smaller, the concentration of the unburned gas in the exhaust flowing out from the three-way catalyst rapidly rises starting from a certain storage amount near zero (Clowlim in the figure).

In the above way, according to the three-way catalyst used in the present embodiment, the characteristics of removal of the $NO_X$ and unburned gas in the exhaust change in accordance with the air-fuel ratio of the exhaust flowing into the three-way catalyst and the oxygen storage amount. Note that, if having a catalytic action and oxygen storage ability, the exhaust purification catalyst may also be a catalyst different from a three-way catalyst.

The first air-fuel ratio sensor 213 is provided at the header pipe 31b of the exhaust manifold 31 and detects an air-fuel ratio of the exhaust flowing into the first catalytic converter 33a.

The second air-fuel ratio sensor 214 is provided at the exhaust pipe 32 between the first catalytic converter 33a and the second catalytic converter 33b and detects the air-fuel ratio of the exhaust flowing out from the first catalytic converter 33a and flowing into the second catalytic converter 33b.

The third air-fuel ratio sensor 215 is provided at the exhaust pipe 32 at the downstream side in the direction of flow of exhaust from the second catalytic converter 33b and detects the air-fuel ratio of the exhaust flowing out from the second catalytic converter 33b. In the present embodiment, as the first air-fuel ratio sensor 213, second air-fuel ratio sensor 214, and third air-fuel ratio sensor 215, air-fuel ratio sensors of the same configuration are used.

Figure 3:
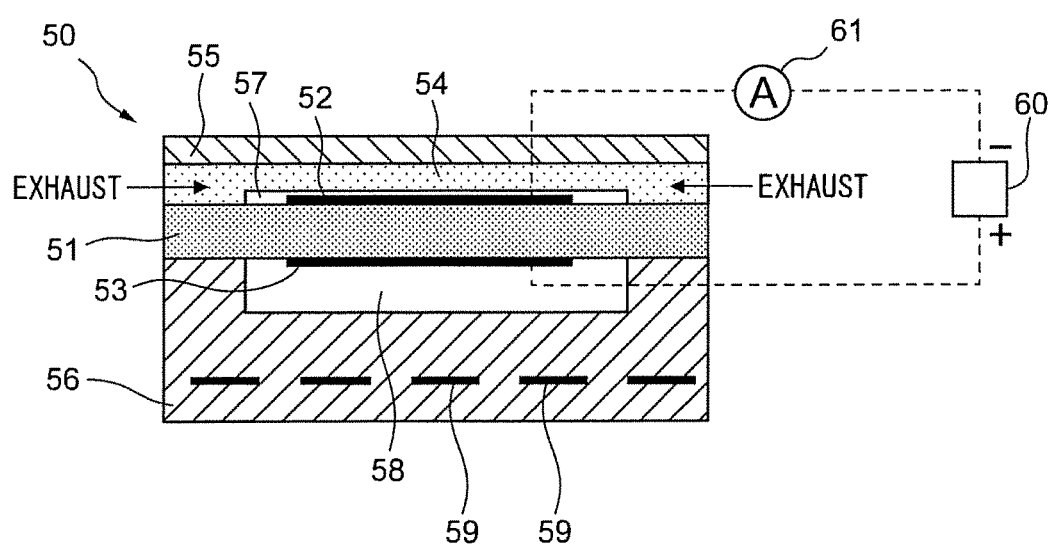
FIG. 3 is a general cross-sectional view of a sensor element of an air-fuel ratio sensor.

FIG. 3 is a schematic cross-sectional view of a sensor element 50 of the first air-fuel ratio sensor 213, second air-fuel ratio sensor 214, and third air-fuel ratio sensor 215.

As shown in FIG. 3, the sensor element 50 is provided with a solid electrolyte layer 51, an exhaust side electrode 52 arranged at one side surface of the solid electrolyte layer 51, an atmosphere side electrode 53 arranged at the other side surface of the solid electrolyte layer 51, a diffusion regulating layer 54 regulating diffusion of the exhaust passing through it, a protective layer 55 protecting the diffusion regulating layer 54, and a heater part 56 heating the sensor element 50.

On one side surface of the solid electrolyte layer 51, the diffusion regulating layer 54 is provided. On the side surface at the opposite side from the side surface of the diffusion regulating layer 54 at the solid electrolyte layer 51 side, the protective layer 55 is provided. In the present embodiment, between the solid electrolyte layer 51 and the diffusion regulating layer 54, a measured gas chamber 57 is formed. Into this measured gas chamber 57, gas to be detected by the air-fuel ratio sensors 213, 214, 215, that is, exhaust, is made to be introduced through the diffusion regulating layer 54. Further, the exhaust side electrode 52 is arranged inside the measured gas chamber 57. Therefore, the exhaust side electrode 52 becomes exposed to exhaust through the diffusion regulating layer 54. Note that, the measured gas chamber 57 is not necessarily provided. The device may also be configured so that the diffusion regulating layer 54 directly contacts the surface of the exhaust side electrode 52.

On the other side surface of the solid electrolyte layer 51, the heater part 56 is provided. Between the solid electrolyte layer 51 and the heater part 56, a reference gas chamber 58 is formed. Inside this reference gas chamber 58, reference gas is introduced. In the present embodiment, the reference gas chamber 58 is opened to the atmosphere. Accordingly, the atmosphere is introduced as the reference gas into the reference gas chamber 58. The atmosphere side electrode 53 is arranged inside the reference gas chamber 58. Therefore, the atmosphere side electrode 53 is exposed to the reference gas (reference atmosphere).

The heater part 56 is provided with a plurality of heaters 59. These heaters 59 can be used to control the temperatures of the air-fuel ratio sensors 213, 214, 215, in particular the temperature of the solid electrolyte layer 51. The heater part 56 has a sufficient heat generation capacity for heating the solid electrolyte layer 51 until activating.

The solid electrolyte layer 51 is formed by a sintered body of an oxygen ion conductive oxide comprised of $ZrO_2$ (zirconia), $HfO_2$, $ThO_2$, $Bi_2O_3$, etc. in which CaO, MgO, $Y_2O_3$, $Yb_2O_3$, etc. is mixed as a stabilizer. Further, the diffusion regulating layer 54 is formed by a porous sintered article of alumina, magnesia, silica, spinel, mullite, or other heat resistant inorganic substance. Furthermore, the exhaust side electrode 52 and atmosphere side electrode 53 are formed by platinum or another high catalytic activity precious metal.

Further, between the exhaust side electrode 52 and the atmosphere side electrode 53, a sensor applied voltage Vr is applied by a voltage application device 60 mounted at the electronic control unit 200. In addition, the electronic control unit 200 is provided with a current detection device 61 detecting the current flowing across the electrodes 52, 53 through the solid electrolyte layer 51 when the voltage application device 60 applies the sensor applied voltage Vr. The current detected by this current detection device 61 is the output current of the air-fuel ratio sensor 213, 214, 215.

Figure 4:
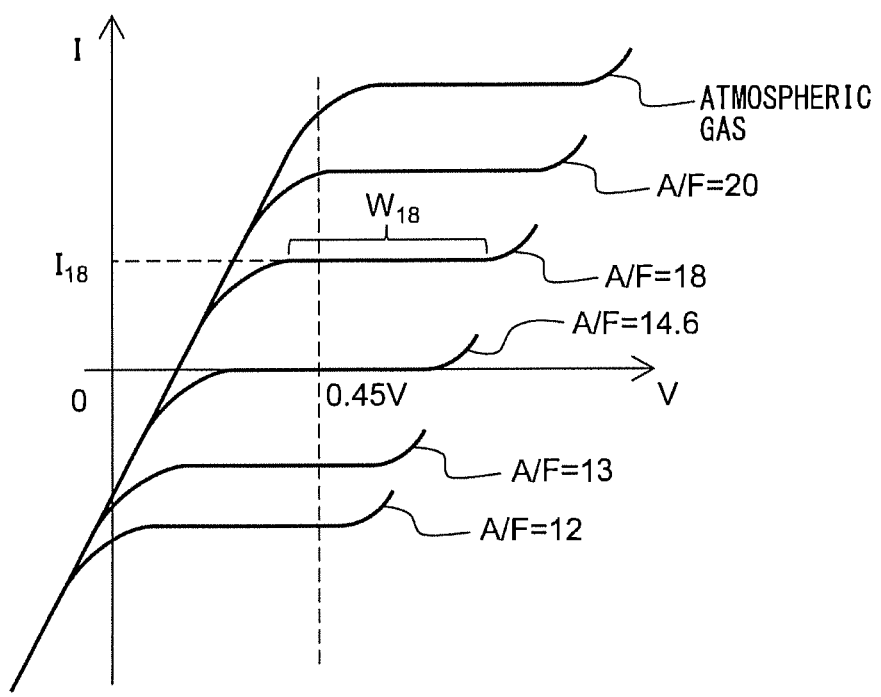
FIG. 4 is a view showing a relationship between a sensor applied voltage and output current at different exhaust air-fuel ratios.

Next, referring to FIG. 4 and FIG. 5, the output characteristics of the first air-fuel ratio sensor 213, second air-fuel ratio sensor 214, and third air-fuel ratio sensor 215 in the present embodiment will be explained. FIG. 4 is a view showing a voltage-current (V-I) characteristic of the first air-fuel ratio sensor 213, second air-fuel ratio sensor 214, and third air-fuel ratio sensor 215 in the present embodiment, while FIG. 5 is a view showing the relationship between the air-fuel ratio of the exhaust flowing around the first air-fuel ratio sensor 213, second air-fuel ratio sensor 214, and third air-fuel ratio sensor 215 when maintaining the applied voltage constant and the output current I.

As will be understood from FIG. 4, in the first air-fuel ratio sensor 213, second air-fuel ratio sensor 214, and third air-fuel ratio sensor 215 of the present embodiment, the output current I becomes larger the higher the air-fuel ratio of the exhaust (the leaner). Further, on the V-I line at each exhaust air-fuel ratio, there is a region substantially parallel to the V-axis, that is, a region where the output current does not change much at all even if the sensor applied voltage changes. This voltage region is called the "limit current region". At this time, the current is called a "limit current". In FIG. 4, the limit current region and limit current when the air-fuel ratio of the exhaust is 18 are respectively shown as $W_{18}$ and $I_{18}$. Therefore, the first air-fuel ratio sensor 213, second air-fuel ratio sensor 214, and third air-fuel ratio sensor 215 can be said to be limit current type air-fuel ratio sensors.

Figure 5:
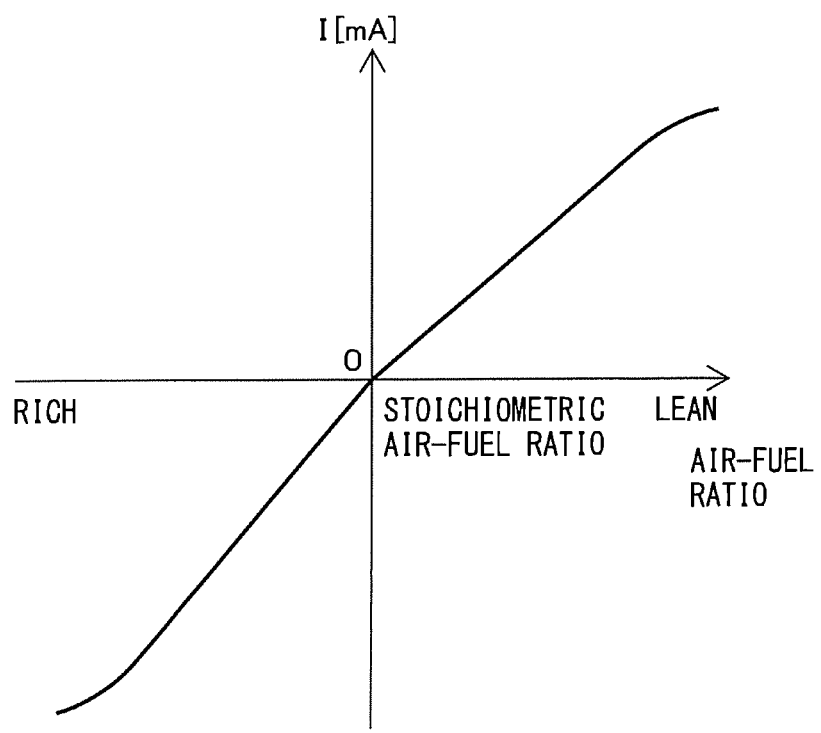
FIG. 5 is a view showing a relationship between an exhaust air-fuel ratio and output current when making the sensor applied voltage constant.

FIG. 5 is a view showing the relationship between the air-fuel ratio of the exhaust and the output current I when making the applied voltage a constant 0.45V or so. As will be understood from FIG. 5, in the first air-fuel ratio sensor 213, second air-fuel ratio sensor 214, and third air-fuel ratio sensor 215, the output current changes linearly (proportionally) to the air-fuel ratio of the exhaust so that the higher the air-fuel ratio of the exhaust (that is, the leaner it is), the greater the output current I from the first air-fuel ratio sensor 213, second air-fuel ratio sensor 214, and third air-fuel ratio sensor 215. In addition, the first air-fuel ratio sensor 213, second air-fuel ratio sensor 214, and third air-fuel ratio sensor 215 are configured so that the output current I becomes zero when the air-fuel ratio of the exhaust is the stoichiometric air-fuel ratio. Further, when the air-fuel ratio of the exhaust becomes larger by a certain extent or more or when it becomes smaller by a certain extent or less, the ratio of the change of the output current with respect to the change in the air-fuel ratio of the exhaust becomes smaller.

Note that, in the above example, a limit current type air-fuel ratio sensor was used as each of the first air-fuel ratio sensor 213, second air-fuel ratio sensor 214, and third air-fuel ratio sensor 215. However, if the output current changes linearly with respect to the air-fuel ratio of the exhaust, for example, a cup-shaped limit current type air-fuel ratio sensor or another structure of limit current type air-fuel ratio sensor or an air-fuel ratio sensor not of the limit current type or any other air-fuel ratio sensor may also be used as each of the first air-fuel ratio sensor 213, second air-fuel ratio sensor 214, and third air-fuel ratio sensor 215. Further, the first air-fuel ratio sensor 213, second air-fuel ratio sensor 214, and third air-fuel ratio sensor 215 may also be different structures of air-fuel ratio sensors.

Returning to FIG. 1, the electronic control unit 200 is configured by a digital computer and is provided with components connected with each other by a bidirectional bus 201 such as a ROM (read only memory) 202, RAM (random access memory) 203, CPU (microprocessor) 204, input port 205, and output port 206.

The input port 205 receives as input the output signals of the above-mentioned air flow meter 211 or throttle sensor 212, first air-fuel ratio sensor 213, second air-fuel ratio sensor 214, third air-fuel ratio sensor 215, etc. through corresponding AD converters 207. Further, the input port 205 receives as input the output voltage of the load sensor 217 generating an output voltage proportional to the amount of depression of the accelerator pedal 220 (below, referred to as the "amount of accelerator depression") through a corresponding AD converter 207. Further, the input port 205 receives as input the output signal of the crank angle sensor 218 generating an output pulse each time the crankshaft of the engine body 1 rotates by for example 15° as a signal for calculating the engine speed etc. In this way, the input port 205 receives as input the output signals of the various sensors required for controlling the internal combustion engine 100.

The output port 206 is electrically connected through corresponding drive circuits 208 to the fuel injectors 13 and spark plugs 14, the throttle actuator 25, and other control parts.

The electronic control unit 200 outputs control signals for controlling the control parts to control the internal combustion engine 100 based on the output signals of the various sensors input to the input port 205. Below, the control of the air-fuel ratio of the internal combustion engine 100 performed by the electronic control unit 200 will be explained.

Summary of Air-Fuel Ratio Control

The electronic control unit 200 controls the air-fuel ratio of the exhaust discharged from the combustion chambers 6 of the engine body 1 so that the output air-fuel ratio of the first air-fuel ratio sensor 213 becomes the target air-fuel ratio. Specifically, the electronic control unit 200 performs feedback control on the amounts of fuel injection from the fuel injectors 13 based on the output air-fuel ratio of the first air-fuel ratio sensor 213 so that the output air-fuel ratio of the first air-fuel ratio sensor 213 becomes the target air-fuel ratio. Note that the "output air-fuel ratio" means the air-fuel ratio corresponding to the output values of the air-fuel ratio sensors 213, 214, 215. Further, the electronic control unit 200 performs, as target air-fuel ratio setting control for setting the target air-fuel ratio, normal control alternately switching the target air-fuel ratio between a predetermined first lean air-fuel ratio AFL1 larger than the stoichiometric air-fuel ratio and a predetermined first rich air-fuel ratio AFR1 smaller than the stoichiometric air-fuel ratio.

Rich Failure Control as Normal Control

In the present embodiment, as normal control, rich failure control is performed periodically making the oxygen storage amount (below, referred to as the "first oxygen storage amount") OSAsc of the first three-way catalyst 34 zero to cause rich failure of the first three-way catalyst 34.

During rich failure control, when the output air-fuel ratio AFmid of the second air-fuel ratio sensor 214 becomes a rich air-fuel ratio, the electronic control unit 200 switches the target air-fuel ratio to a predetermined first lean air-fuel ratio AFL1, then maintains it at the first lean air-fuel ratio AFL1. In the present embodiment, the electronic control unit 200 judges that the output air-fuel ratio AFmid of the second air-fuel ratio sensor 214 has become a rich air-fuel ratio and switches the target air-fuel ratio to the first lean air-fuel ratio AFL1 when the output air-fuel ratio AFmid of the second air-fuel ratio sensor 214 becomes a rich judgment air-fuel ratio AFrefri slightly smaller than the stoichiometric air-fuel ratio (for example, 14.55) or becomes less.

The first lean air-fuel ratio AFL1 is a predetermined air-fuel ratio a certain degree larger than the stoichiometric air-fuel ratio, for example, is made 14.65 to 20, preferably 14.65 to 18, more preferably 14.65 to 16 or so. The first lean air-fuel ratio AFL1 can be expressed as an air-fuel ratio comprised of the air-fuel ratio forming the control center (below, referred to as the "control center air-fuel ratio", in the present embodiment, the stoichiometric air-fuel ratio.) AFcen plus a lean correction amount.

Further, the electronic control unit 200 performs first oxygen storage amount estimating control for estimating the first oxygen storage amount OSAsc in parallel to control for setting the target air-fuel ratio. Specifically, the electronic control unit 200 calculates the oxygen excess/deficiency OED of the exhaust flowing into the first three-way catalyst 34 as needed based on the output air-fuel ratio AFup of the first air-fuel ratio sensor 213 and cumulatively adds this oxygen excess/deficiency OED to estimate the first oxygen storage amount OSAsc. Note that the "oxygen excess/deficiency OED" means the amount of oxygen becoming in excess or the amount of oxygen becoming deficient (amount of excess unburned gas etc.) when trying to make the air-fuel ratio of the exhaust flowing into the first three-way catalyst 34 the stoichiometric air-fuel ratio. In the present embodiment, the electronic control unit 200, as shown in the following formula (1), calculates the oxygen excess/deficiency OED as needed based on the output air-fuel ratio AFup of the first air-fuel ratio sensor 213, the control center air-fuel ratio AFcen, and the amount of feed of fuel Qi from the fuel injectors 13 (or estimated value of amount of intake air to the inside of the combustion chambers 6 calculated based on the output of the air flow meter 211 etc.) Note that in formula (1), 0.23 expresses the oxygen concentration in the air.

$$OED = 0.23 \times Qi \times (AFup - AFcen) \qquad (1)$$

Further, the electronic control unit 200 switches the target air-fuel ratio from the first lean air-fuel ratio AFL1 to a predetermined first rich air-fuel ratio AFR1 smaller than the rich judgment air-fuel ratio AFrefri, then maintains it at the first rich air-fuel ratio AFR1 if the estimated value of the first oxygen storage amount OSAsc becomes a predetermined first switching reference amount Crefup1 or more in the time period when setting the target air-fuel ratio to the first lean air-fuel ratio AFL1.

The first rich air-fuel ratio AFR1 is a predetermined air-fuel ratio smaller by a certain extent than the stoichiometric air-fuel ratio, for example, is made 12 to 14.58, preferably 13 to 14.57, more preferably 14 to 14.55 or so. The first rich air-fuel ratio AFR1 can be expressed as an air-fuel ratio comprised of the control center air-fuel ratio (in the present embodiment, the stoichiometric air-fuel ratio) AFcen minus the rich correction amount. Note that in the present embodiment, the difference of the first rich air-fuel ratio AFR1 from the stoichiometric air-fuel ratio (rich degree) is made the difference of the first lean air-fuel ratio AFL1 from the stoichiometric air-fuel ratio (lean degree) or less.

Further, the electronic control unit 200 switches the target air-fuel ratio again to the first lean air-fuel ratio AFL1, then repeats a similar operation if the output air-fuel ratio AFmid of the second air-fuel ratio sensor 214 again becomes the rich judgment air-fuel ratio AFrefri or less in the time period when setting the target air-fuel ratio to the first rich air-fuel ratio AFR1.

However, even if performing rich failure control, sometimes the actual oxygen storage amount of the first three-way catalyst 34 will reach the maximum storage amount Cmaxup before the estimated value of the first oxygen storage amount OSAsc reaches the first switching reference amount Crefup1. As the causes of this, for example, the maximum storage amount Cmaxup of the first three-way catalyst 34 falling and the air-fuel ratio of the exhaust temporarily flowing into the first three-way catalyst 34 rapidly changing may be mentioned. If in this way the actual oxygen storage amount of the first three-way catalyst 34 reaches the maximum storage amount Cmaxup, lean air-fuel ratio exhaust flows out from the first three-way catalyst 34. Therefore, in the present embodiment, when the output air-fuel ratio AFmid of the second air-fuel ratio sensor 214 becomes a lean air-fuel ratio, the target air-fuel ratio is switched to the first rich air-fuel ratio AFR1.

Note that in the present embodiment, the electronic control unit 200 judges that the output air-fuel ratio AFmid of the second air-fuel ratio sensor 214 has become the lean air-fuel ratio when the output air-fuel ratio AFmid of the second air-fuel ratio sensor 214 becomes a lean judgment air-fuel ratio AFrefle (for example, 14.65) slightly larger than the stoichiometric air-fuel ratio or becomes more.

Explanation of Rich Failure Control Using Time Chart

Figure 6:
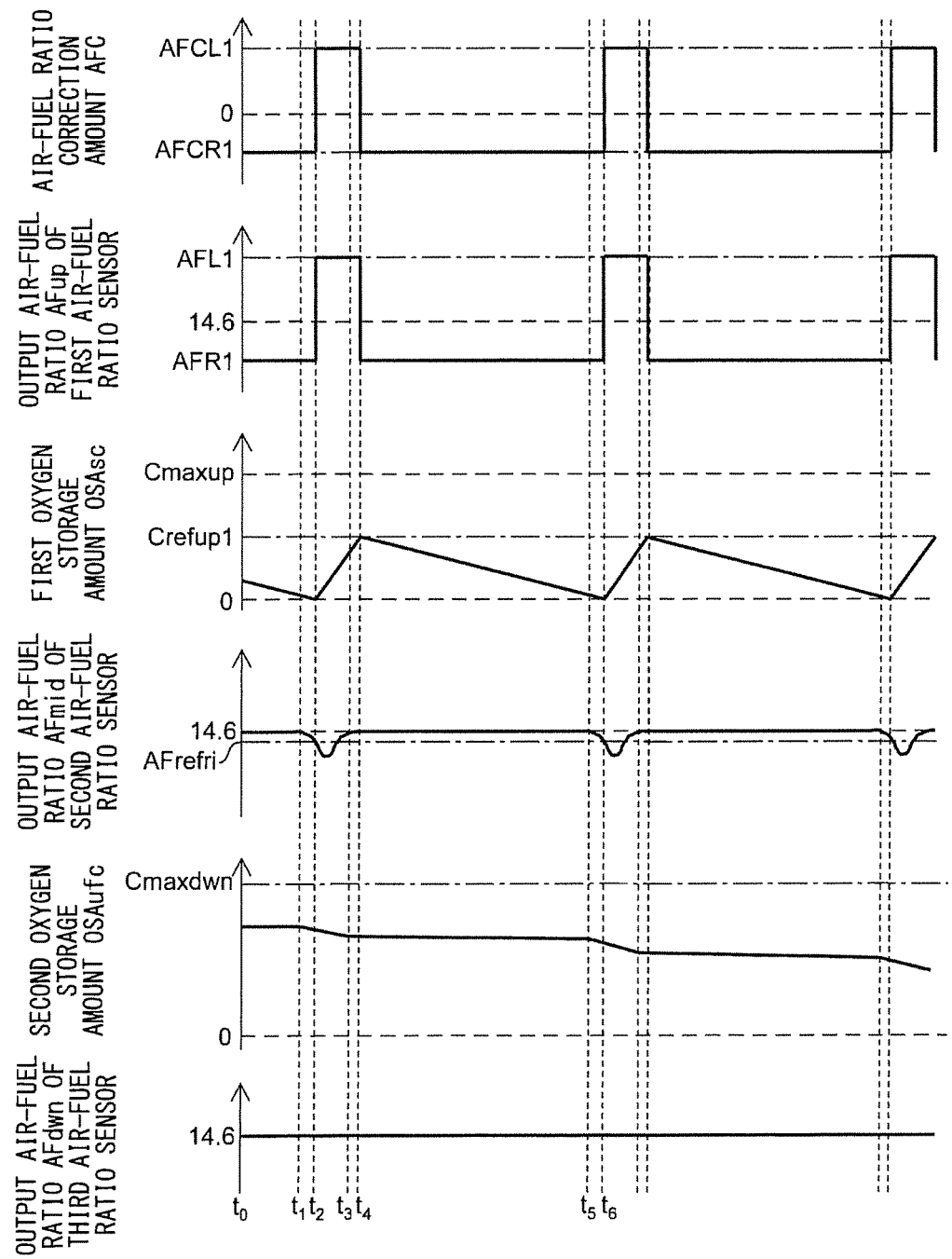
FIG. 6 is a time chart explaining the operation of rich failure control.

Referring to FIG. 6, the rich failure control operation will be explained. FIG. 6 is a time chart showing the air-fuel ratio correction amount AFC when performing rich failure control, the output air-fuel ratio AFup of the first air-fuel ratio sensor 213, the oxygen storage amount OSAsc of the first three-way catalyst 34 (first oxygen storage amount), the output air-fuel ratio AFmid of the second air-fuel ratio sensor 214, the oxygen storage amount OSAufc of the second three-way catalyst 35 (below, referred to as the "second oxygen storage amount"), and the output air-fuel ratio AFdwn of the third air-fuel ratio sensor.

Note that the time chart shown in FIG. 6 shows the operation during rich failure control after performing rich failure control for a while after fuel cut control. That is, in FIG. 6, before the time t0, fuel cut control is being performed. FIG. 6 shows the operation during rich failure control after performing rich failure control for a while after the fuel cut control. "Fuel cut control" is control stopping the feed of fuel to the combustion chambers 6 of the engine body 1 when the vehicle in which the internal combustion engine 100 is mounted is decelerating or otherwise when a predetermined fuel cut execution condition stands during operation of the internal combustion engine 100. If fuel cut control is performed, the feed of fuel to the combustion chambers 6 of the engine body 1 is stopped and a large amount of air flows into the first three-way catalyst 34 and second three-way catalyst 35. For this reason, the first oxygen storage amount OSAsc and second oxygen storage amount OSAufc respectively rapidly increase. Therefore, in FIG. 6, before the time t1, the first three-way catalyst 34 and second three-way catalyst 35 respectively are in states storing certain extents of oxygen.

Further, in FIG. 6, the "air-fuel ratio correction amount AFC" expresses the amount of correction relating to the target air-fuel ratio of the exhaust flowing into the first three-way catalyst 34. When the air-fuel ratio correction amount AFC is "0", the target air-fuel ratio becomes the control center air-fuel ratio (in the present embodiment, the stoichiometric air-fuel ratio) AFcen. When the air-fuel ratio correction amount AFC is a positive value, the target air-fuel ratio becomes an air-fuel ratio larger than the control center air-fuel ratio AFcen. When the air-fuel ratio correction amount AFC is a negative value, the target air-fuel ratio is an air-fuel ratio smaller than the control center air-fuel ratio AFcen. Note that the control center air-fuel ratio AFcen means the air-fuel ratio to and from which the air-fuel ratio correction amount AFC is added or subtracted in accordance with the engine operating state, that is, the air-fuel ratio becoming the reference when making the target air-fuel ratio change in accordance with the air-fuel ratio correction amount AFC.

In the time chart shown in FIG. 6, before the time t1, the air-fuel ratio correction amount AFC is made a predetermined first rich correction amount AFCR1. Due to this, the target air-fuel ratio is set to a first rich air-fuel ratio AFR1 smaller than the stoichiometric air-fuel ratio. For this reason, before the time t1, the output air-fuel ratio AFup of the first air-fuel ratio sensor 213 becomes the first rich air-fuel ratio AFR1 and the exhaust flowing into the first three-way catalyst 34 contains unburned gas. The unburned gas contained in the exhaust flowing into the first three-way catalyst 34 is removed by oxidation at the first three-way catalyst 34. Along with this, the first oxygen storage amount OSAsc gradually decreases. Due to purification at the first three-way catalyst 34, the exhaust flowing out from the first three-way catalyst 34 does not contain unburned gas, so the output air-fuel ratio AFmid of the second air-fuel ratio sensor 214 becomes substantially the stoichiometric air-fuel ratio. Further, the air-fuel ratio of the exhaust flowing into the first three-way catalyst 34 is a first rich air-fuel ratio AFR1 smaller than the stoichiometric air-fuel ratio, so the amount of discharge of $NO_X$ from the first three-way catalyst 34 becomes substantially zero.

If the first oxygen storage amount OSAsc gradually decreases, the first oxygen storage amount OSAsc approaches zero at the time t1. Along with this, part of the unburned gas flowing into the first three-way catalyst 34 starts to flow out from the first three-way catalyst 34 without being removed by oxidation and flows through the exhaust pipe 32 between the first three-way catalyst 34 and the second three-way catalyst 35 to the second three-way catalyst 35.

Due to this, at the time t1 and on, the output air-fuel ratio AFmid of the second air-fuel ratio sensor 214 gradually falls. As a result, at the time t2, the output air-fuel ratio AFmid of the second air-fuel ratio sensor 214 reaches the rich judgment air-fuel ratio AFrefri. Further, at the time t1 and on, the unburned gas contained in the exhaust flowing out from the first three-way catalyst 34 to the second three-way catalyst 35 is removed by oxidation at the second three-way catalyst 35, so the second oxygen storage amount OSAufc gradually decreases. Due to purification at the second three-way catalyst 35, the exhaust flowing out from the second three-way catalyst 35 does not contain unburned gas, so the output air-fuel ratio AFdwn of the third air-fuel ratio sensor 215 becomes the substantially stoichiometric air-fuel ratio.

At the time t2, if the output air-fuel ratio AFmid of the second air-fuel ratio sensor 214 becomes the rich judgment air-fuel ratio AFrefri or less, to make the first oxygen storage amount OSAsc increase, the air-fuel ratio correction amount AFC is switched to the first lean correction amount AFCL1 and the target air-fuel ratio is switched from the first rich air-fuel ratio AFR1 to the first lean air-fuel ratio AFL1.

Note that in the present embodiment, after the output air-fuel ratio AFmid of the second air-fuel ratio sensor 214 reaches the rich judgment air-fuel ratio AFrefri, the target air-fuel ratio is switched. This is because even if the oxygen storage amount of the first three-way catalyst 34 is sufficient, the air-fuel ratio of the exhaust flowing out from the first three-way catalyst 34 sometimes ends up deviating from the stoichiometric air-fuel ratio. Conversely speaking, the rich judgment air-fuel ratio AFrefri is made an air-fuel ratio which the air-fuel ratio of the exhaust flowing out from the first three-way catalyst 34 will not reach when the oxygen storage amount of the first three-way catalyst 34 is sufficient.

At the time t2, if the target air-fuel ratio is switched to the first lean air-fuel ratio AFL1, the output air-fuel ratio AFup of the first air-fuel ratio sensor 213 becomes the first lean air-fuel ratio AFL1. Note that in actuality, there is a delay from when switching the target air-fuel ratio to when the air-fuel ratio of the exhaust flowing into the first three-way catalyst 34 changes, but in the illustrated example, for convenience, it is deemed to change simultaneously.

Further, at the time t2, the output air-fuel ratio AFup of the first air-fuel ratio sensor 213 becomes the first lean air-fuel ratio AFL1. If the air-fuel ratio of the exhaust flowing into the first three-way catalyst 34 changes from the rich air-fuel ratio to the lean air-fuel ratio, after that, the first oxygen storage amount OSAsc gradually increases.

Due to this, the air-fuel ratio of the exhaust flowing out from the first three-way catalyst 34 changes to the stoichiometric air-fuel ratio. At the time t3, the output air-fuel ratio AFmid of the second air-fuel ratio sensor 214 converges to the stoichiometric air-fuel ratio. For this reason, at the time t3 and on, the second oxygen storage amount OSAufc is maintained constant without decreasing. Note that at the time t2 and on, the air-fuel ratio of the exhaust flowing into the first three-way catalyst 34 becomes the first lean air-fuel ratio AFL1, but there is sufficient leeway in the oxygen storage ability of the first three-way catalyst 34, so the oxygen in the inflowing exhaust is stored in the first three-way catalyst 34 and the $NO_X$ is removed by reduction. Therefore, the amount of discharge of $NO_X$ from the first three-way catalyst 34 becomes substantially zero.

At the time t4, if the first oxygen storage amount OSAsc reaches the first switching reference amount Crefup1, to suspend storage of oxygen at the first three-way catalyst 34, the air-fuel ratio correction amount AFC is switched to the first rich correction amount AFCR1 and the target air-fuel ratio is switched to the first rich air-fuel ratio AFR1.

Here, in the example shown in FIG. 6, at the time t4, the first oxygen storage amount OSAsc falls simultaneously with the target air-fuel ratio being switched, but in actuality, a delay occurs from when switching the target air-fuel ratio to when the first oxygen storage amount OSAsc falls. Further, sometimes acceleration of the vehicle mounting the internal combustion engine 100 causes the engine load to rise and the amount of intake air greatly deviates for an instant etc. or otherwise the air-fuel ratio of the exhaust flowing into the first three-way catalyst 34 unintentionally greatly deviates from the target air-fuel ratio for an instant.

As opposed to this, the first switching reference amount Crefup1 is set sufficiently lower than the maximum storage amount Cmaxup when the first three-way catalyst 34 is new (not yet used). For this reason, even if a delay such as explained above occurs and the actual air-fuel ratio of the exhaust unintentionally greatly deviates from the target air-fuel ratio for an instant, the first oxygen storage amount OSAsc will not reach the maximum storage amount Cmaxup. Conversely speaking, the first switching reference amount Crefup1 is made a sufficiently small amount so that the first oxygen storage amount OSAsc does not reach the maximum storage amount Cmaxup even if the above such delay or unintentional deviation of the air-fuel ratio occurs. For example, the first switching reference amount Crefup1 is made ¾ or less of the maximum storage amount Cmaxup of the first three-way catalyst 34, preferably ½ or less, more preferably ⅕ or less.

At the time t4, if the target air-fuel ratio is switched to the first rich air-fuel ratio AFR1, the output air-fuel ratio AFup of the first air-fuel ratio sensor 213 becomes the first rich air-fuel ratio AFR1. If the output air-fuel ratio AFup of the first air-fuel ratio sensor 213 becomes the first rich air-fuel ratio AFR1 and the air-fuel ratio of the exhaust flowing into the first three-way catalyst 34 changes from the lean air-fuel ratio to the rich air-fuel ratio, exhaust containing unburned gas flows into the first three-way catalyst 34. For this reason, the first oxygen storage amount OSAsc gradually decreases. At the time t5, in the same way as the time t1, the output air-fuel ratio AFmid of the second air-fuel ratio sensor 214 starts to fall and the second oxygen storage amount OSAufc starts to decrease. At this time as well, the air-fuel ratio of the exhaust flowing into the first three-way catalyst 34 is a first rich air-fuel ratio AFR1 smaller than the stoichiometric air-fuel ratio, so the amount of discharge of $NO_X$ from the first three-way catalyst 34 becomes substantially zero.

Next, at the time t6, in the same way as the time t2, the output air-fuel ratio AFmid of the second air-fuel ratio sensor 214 reaches the rich judgment air-fuel ratio AFrefri. Due to this, the air-fuel ratio correction amount AFC is switched to the first lean correction amount AFCL1, the target air-fuel ratio is switched to the first lean air-fuel ratio AFL1, then the cycle of the times t1 to t5 is repeated.

As will be understood from the above explanation, so long as performing rich failure control, it is possible to constantly suppress the amount of discharge of the $NO_X$ from the first three-way catalyst 34 and, basically, possible to make the amount of discharge of the $NO_X$ from the first three-way catalyst 34 substantially zero. Further, in general, the three-way catalyst falls in oxygen storage ability if the oxygen storage amount is maintained constant. That is, to maintain the oxygen storage ability of the three-way catalyst high, it is necessary to cause the oxygen storage amount of the three-way catalyst to change. As opposed to this, according to the present embodiment, as shown in FIG. 6, the first storage amount OSAsc and second storage amount OSAufc constantly fluctuate, so it is possible to suppress a drop in oxygen storage ability of the first three-way catalyst 34 and second three-way catalyst 35.

Note that, in the present embodiment, at the times t2 to t4, the air-fuel ratio correction amount AFC is maintained at the first lean correction amount AFCL1. However, in such a time period, the air-fuel ratio correction amount AFC does not necessarily have to be maintained constant and may be set to gradually decrease or otherwise change. Alternatively, in the time period of the times t2 to t4, the air-fuel ratio correction amount AFC may also be temporarily made a value smaller than 0 (for example, first rich correction amount AFCR1). That is, in the time period of the times t2 to t4, the target air-fuel ratio may temporarily be made the rich air-fuel ratio (for example, first rich air-fuel ratio AFR1).

Similarly, in the present embodiment, at the times t4 to t6, the air-fuel ratio correction amount AFC is maintained at the first rich correction amount AFCR1. However, in such a time period, the air-fuel ratio correction amount AFC does not necessarily have to be maintained constant and may be set to gradually increase or otherwise change. Alternatively, in the time period of the times t4 to t6, the air-fuel ratio correction amount AFC may also be temporarily made a value larger than 0 (for example, first lean correction amount AFCL1). That is, in the time period of the times t4 to t6, the target air-fuel ratio may temporarily be made the lean air-fuel ratio (for example, first lean air-fuel ratio AFL1).

However, even in this case, the air-fuel ratio correction amount AFC at the times t2 to t4 is set so that the difference between the average value of the target air-fuel ratio in this time period and the stoichiometric air-fuel ratio becomes larger than the difference between the average value of the target air-fuel ratio at the times t4 to t6 and the stoichiometric air-fuel ratio.

Note that, the air-fuel ratio correction amount AFC in such a present embodiment is set, that is, the target air-fuel ratio is set, by the electronic control unit 200. Therefore, the electronic control unit 200 can be said to continuously or intermittently make the target air-fuel ratio of the exhaust flowing into the first three-way catalyst 34 the lean air-fuel ratio when the output air-fuel ratio AFmid of the second air-fuel ratio sensor 214 becomes the rich judgment air-fuel ratio AFrefri or less during rich failure control until the estimated value of the first oxygen storage amount OSAsc becomes the first switching reference amount Crefup1 and to continuously or intermittently make the target air-fuel ratio the rich air-fuel ratio when the estimated value of the first oxygen storage amount OSAsc becomes the switching reference amount Crefup1 or more until the output air-fuel ratio AFmid of the second air-fuel ratio sensor 214 becomes the rich judgment air-fuel ratio AFrefri or less without the first oxygen storage amount OSAsc reaching the maximum storage amount Cmaxup.

Explained more simply, in the present embodiment, the electronic control unit 200 can be said to switch the target air-fuel ratio to the lean air-fuel ratio when the output air-fuel ratio AFmid of the second air-fuel ratio sensor 214 becomes the rich judgment air-fuel ratio AFrefri or less during rich failure control and switch the target air-fuel ratio to the rich air-fuel ratio when the estimated value of the first oxygen storage amount OSAsc becomes the first switching reference amount Crefup1 or more.

Further, in the present embodiment, when the first oxygen storage amount OSAsc becomes the first switching reference value Crefup1 or more, the target air-fuel ratio is switched from the first lean air-fuel ratio AFL1 to the first rich air-fuel ratio AFR1. However, the timing of switching the target air-fuel ratio from the first lean air-fuel ratio AFL1 to the first rich air-fuel ratio AFR1 may use as a reference for example the engine operating time from when the target air-fuel ratio is switched from the first rich air-fuel ratio AFR1 to the first lean air-fuel ratio AFL1 or the cumulative amount of intake air or other parameters. However, in this case as well, while the first oxygen storage amount OSAsc is estimated as being smaller than the maximum storage amount Cmax, the target air-fuel ratio has to be switched from the first lean air-fuel ratio AFL1 to the first rich air-fuel ratio AFR1.

Problems Arising During Performance of Rich Failure Control

If performing rich failure control as control for setting the target air-fuel ratio in this way, after the target air-fuel ratio is switched to the first lean air-fuel ratio AFL1, when the first oxygen storage amount OSAsc has become a first switching reference amount Crefup1 smaller than the maximum storage amount Cmaxup or has become more, the target air-fuel ratio is switched to the first rich air-fuel ratio AFR1. For this reason, it is possible to constantly suppress the amount of discharge of $NO_X$ from the first three-way catalyst 34 and basically possible to make the amount of discharge of $NO_X$ from the first three-way catalyst 34 substantially zero.

On the other hand, after the target air-fuel ratio is switched to the first rich air-fuel ratio AFR1, when unburned gas starts to flow out from the first three-way catalyst 34 and the output air-fuel ratio AFmid of the second air-fuel ratio sensor 214 becomes a rich judgment air-fuel ratio AFrefri slightly richer than the stoichiometric air-fuel ratio or becomes less, the target air-fuel ratio is switched to the first lean air-fuel ratio AFL1. For this reason, in the time period around when switching the target air-fuel ratio from the first rich air-fuel ratio AFR1 to the first lean air-fuel ratio AFL1 (in the time chart of FIG. 6, for example in the time period from the time t1 to the time t3), unburned gas flows out from the first three-way catalyst 34.

In this time period around when switching the target air-fuel ratio from the first rich air-fuel ratio AFR1 to the first lean air-fuel ratio AFL1, the unburned gas flowing out from the first three-way catalyst 34 is removed by oxidation by the oxygen stored in the second three-way catalyst 35 if the second three-way catalyst 35 stores oxygen.

Therefore, when performing rich failure control as control for switching the target air-fuel ratio, each time the target air-fuel ratio is switched from the first rich air-fuel ratio AFR1 to the first lean air-fuel ratio AFL1, unburned gas temporarily flows out from the first three-way catalyst 34 though slight. To remove unburned gas by oxidation, oxygen stored in the second three-way catalyst 35 is consumed, so the second oxygen storage amount OSAufc decreases.

The second oxygen storage amount OSAufc increases if fuel cut control is performed as explained above, but the fuel cut control does not necessarily have to be performed at certain intervals. For this reason, sometimes fuel cut control is not performed over a long time period. In such a case, each time the target air-fuel ratio is switched from the first rich air-fuel ratio AFR1 to the first lean air-fuel ratio AFL1, the second oxygen storage amount OSAufc continues to decrease, so finally the second oxygen storage amount OSAufc becomes zero and the unburned gas can no longer be removed by oxidation by the second three-way catalyst 35.

Therefore, in the present embodiment, when unburned gas starts to flow out from the second three-way catalyst 35 during performance of the rich failure control and the output air-fuel ratio AFdwn of the third air-fuel ratio sensor 215 becomes the rich judgment air-fuel ratio AFrefri or less, rich failure control (normal control) is stopped and control for restoration of the storage amount for increasing the second oxygen storage amount OSAufc is performed as control for setting the target air-fuel ratio.

Control for Restoration of Storage Amount According to First Embodiment

Figure 7:
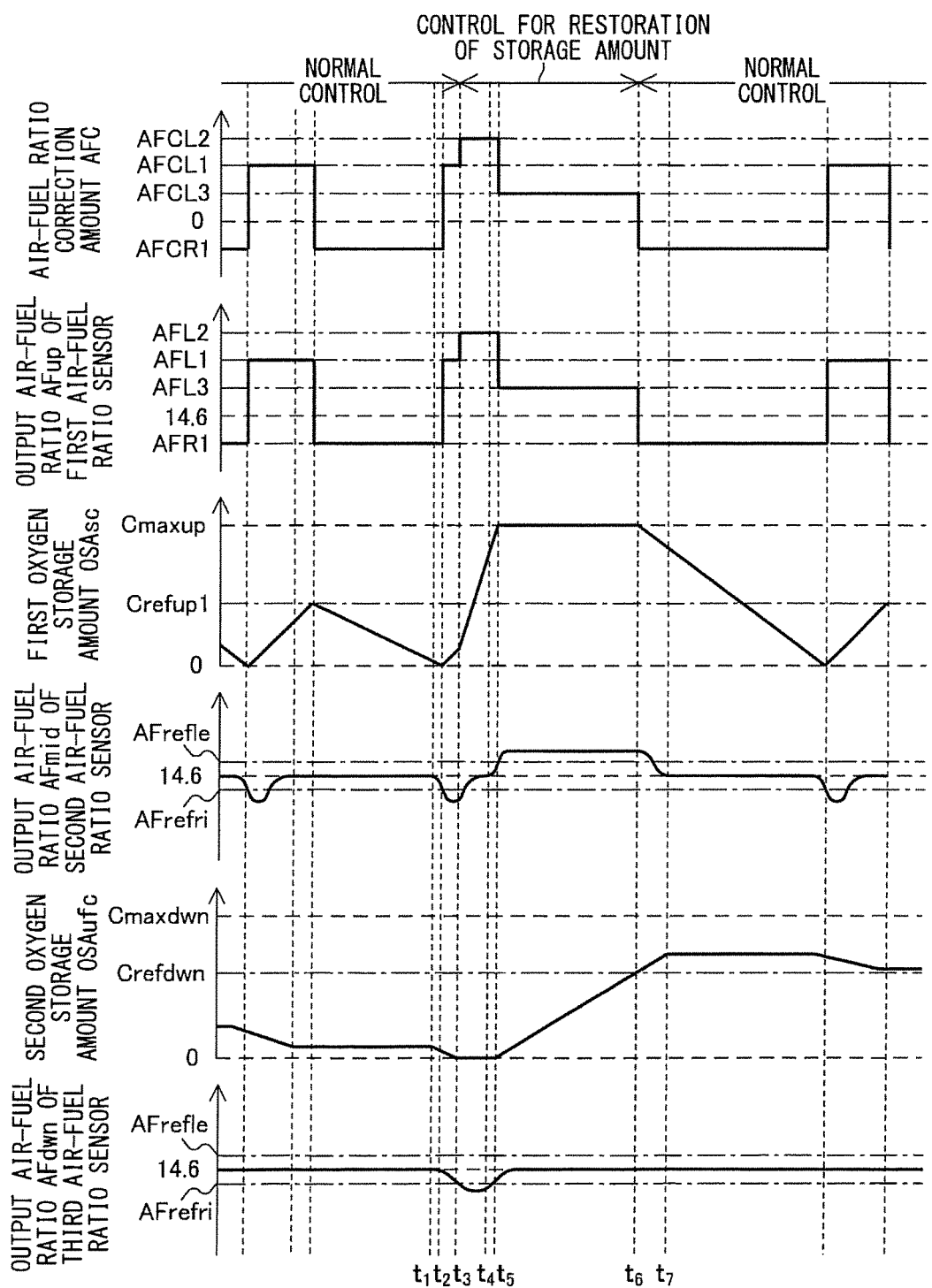
FIG. 7 is a time chart explaining the operation of control for restoration of the storage amount according to the first embodiment of the present invention.

FIG. 7 is a time chart explaining the operation of control for restoration of the storage amount according to the present embodiment.

In the time chart of FIG. 7, before the time t3, rich failure control is performed as explained above referring to FIG. 6. At the time t1, if the first oxygen storage amount OSAsc approaches zero, part of the unburned gas flowing into the first three-way catalyst 34 starts to flow out from the first three-way catalyst 34.

Due to this, at the time t1 and on, the output air-fuel ratio AFmid of the second air-fuel ratio sensor 214 starts to fall. At the time t2, if reaching the rich judgment air-fuel ratio AFrefri, the electronic control unit 200 switches the air-fuel ratio correction amount AFC from the first rich correction amount AFCR1 to the first lean correction amount AFCL1. That is, the target air-fuel ratio is switched from the first rich air-fuel ratio AFR1 to the first lean air-fuel ratio AFL1.

Further, to remove the unburned gas flowing out from the first three-way catalyst 34, oxygen stored in the second three-way catalyst 35 is consumed, so at the time t1 and on, the second oxygen storage amount OSAufc decreases.

At the time t2, the target air-fuel ratio is switched from the first rich air-fuel ratio AFR1 to the first lean air-fuel ratio AFL1, but in actuality there is a time lag until lean air-fuel ratio exhaust flows to the exhaust pipe 32, so the output air-fuel ratio AFmid of the second air-fuel ratio sensor 214 still becomes smaller than the stoichiometric air-fuel ratio. For this reason, at the time t2 and on as well, the second oxygen storage amount OSAufc decreases. Further, near the time t2, if the second oxygen storage amount OSAufc approaches zero, the second three-way catalyst 35 can no longer completely remove the unburned gas and part of the unburned gas flowing into the second three-way catalyst 35 starts to flow out from the second three-way catalyst 35. Due to this, the output air-fuel ratio AFdwn of the third air-fuel ratio sensor 215 starts to fall. At the time t3, the output air-fuel ratio AFdwn of the third air-fuel ratio sensor 215 reaches the rich judgment air-fuel ratio AFrefri.

At the time t3, if the output air-fuel ratio AFdwn of the third air-fuel ratio sensor 215 becomes the rich judgment air-fuel ratio AFrefri or less, the electronic control unit 200 stops the rich failure control (normal control) and starts control for restoration of the storage amount as control for setting the target air-fuel ratio.

The electronic control unit 200 switches the air-fuel ratio correction amount AFC to a predetermined second lean correction amount AFCL2 larger than the first lean correction amount AFCL1 set during execution of rich failure control when starting control for restoration of the storage amount. That is, the target air-fuel ratio is switched to a predetermined second lean air-fuel ratio AFL2 larger than the first lean air-fuel ratio AFL1 set during performance of rich failure control.

Here, to make the second oxygen storage amount OSAufc increase, it is necessary to make the first oxygen storage amount OSAsc increase to the maximum storage amount Cmaxup to render the first three-way catalyst 34 a state in which oxygen cannot be stored and make lean air-fuel ratio exhaust flow out from the first three-way catalyst 34.

At this time, like in the control for restoration of the storage amount according to the present embodiment, by switching the target air-fuel ratio to a second lean air-fuel ratio AFL2 larger than the first lean air-fuel ratio AFL1, it is possible to supply a large amount of oxygen to the first three-way catalyst 34 compared with when setting the target air-fuel ratio to the first lean air-fuel ratio AFL1, so it is possible to make the first oxygen storage amount OSAsc quickly increase. That is, it is possible to make the first oxygen storage amount OSAsc increase up to the maximum storage amount Cmaxup in a short time period, so it is possible to make lean air-fuel ratio exhaust flow out from the first three-way catalyst 34 and quickly supply oxygen to the second three-way catalyst 35.

Further, if switching the target air-fuel ratio to the second lean air-fuel ratio AFL2, exhaust of an air-fuel ratio leaner than during performance of rich failure control flows into the first three-way catalyst 34, so part of the $NO_X$ in the exhaust is liable to flow out from the first three-way catalyst 34 without being removed by reduction by the first three-way catalyst 34. However, during control for restoration of the storage amount, the second oxygen storage amount OSAufc is in a state sufficiently smaller than the maximum storage amount Cmaxdwn, so even if part of the $NO_X$ in the exhaust flows out from the first three-way catalyst 34, the $NO_X$ can be removed by reduction by the second three-way catalyst 35. Therefore, the amount of discharge of $NO_X$ from the second three-way catalyst 35 becomes substantially zero.

At the time t4, if the first oxygen storage amount OSAsc approaches the maximum storage amount Cmaxup, part of the oxygen flowing into the first three-way catalyst 34 starts to flow out from the first three-way catalyst 34. Due to this, at the time t4 and on, the output air-fuel ratio AFmid of the second air-fuel ratio sensor 214 starts to increase. At the time t5, if the first oxygen storage amount OSAsc increases up to the maximum storage amount Cmaxup, the output air-fuel ratio AFmid of the second air-fuel ratio sensor 214 reaches the lean judgment air-fuel ratio AFrefle.

At the time t5, if the output air-fuel ratio AFmid of the second air-fuel ratio sensor 214 becomes the lean judgment air-fuel ratio AFrefle or more, the electronic control unit 200 switches the air-fuel ratio correction amount AFC from the second lean correction amount AFCL2 to a predetermined lean correction amount smaller than the second lean correction amount ACL2. In the present embodiment, the electronic control unit 200 switches the air-fuel ratio correction amount AFC to a predetermined third lean correction amount AFCL3 smaller than the first lean correction amount AFCL1. Due to this, in the present embodiment, the target air-fuel ratio is switched from the second lean air-fuel ratio AFL2 to the predetermined third lean air-fuel ratio AFL3 smaller than the first lean air-fuel ratio AFL1. In this way, the reason for making the target air-fuel ratio an air-fuel ratio with a small lean degree when the output air-fuel ratio AFmid of the second air-fuel ratio sensor 214 becomes the lean judgment air-fuel ratio AFrefle or more will be explained.

Further, at the time t5, if the output air-fuel ratio AFmid of the second air-fuel ratio sensor 214 becomes the lean judgment air-fuel ratio AFrefle or more, the electronic control unit 200 starts the second oxygen storage amount estimation control for estimating the second oxygen storage amount OSAufc in parallel with the control for restoration of the storage amount. Specifically, the electronic control unit 200 calculates the oxygen excess/deficiency OEDufc of the exhaust flowing into the second three-way catalyst 35 as needed based on the output air-fuel ratio AFmid of the second air-fuel ratio sensor 214 and cumulatively adds this oxygen excess/deficiency OEDufc to estimate the second oxygen storage amount OSAufc. The "oxygen excess/deficiency OEDufc" means the amount of oxygen becoming in excess or the amount of oxygen becoming deficient (amount of excess unburned gas etc.) when trying to make the air-fuel ratio of the exhaust flowing into the second three-way catalyst 35 the stoichiometric air-fuel ratio. In the present embodiment, the electronic control unit 200 calculates as needed the oxygen excess/deficiency OEDufc as shown in the following formula (2) based on the output air-fuel ratio AFmid of the second air-fuel ratio sensor 214, the control center air-fuel ratio (in the present embodiment, the stoichiometric air-fuel ratio) AFcen, and the amount of feed of fuel Qi from the fuel injectors 13 (or estimated value of amount of intake air to the inside of the combustion chambers 6 calculated based on the output of the air flow meter 211 etc.) Note that in formula (2), 0.23 expresses the concentration of oxygen in the air.

$$OEDufc=0.23 \times Qi \times (AFmid-AFcen) \quad (2)$$

Here, since the internal combustion engine 100 according to the present embodiment is provided with a third air-fuel ratio sensor 215, when performing control for estimating the second oxygen storage amount, at the time t3, it is possible to estimate that the second oxygen storage amount OSAufc is zero by the fact of the output air-fuel ratio AFdwn of the third air-fuel ratio sensor 215 reaching the rich judgment air-fuel ratio AFrefri. For this reason, when the output air-fuel ratio AFdwn of the third air-fuel ratio sensor 215 reaches the rich judgment air-fuel ratio AFrefri, it is possible to precisely estimate the second oxygen storage amount OSAufc by returning the second oxygen storage amount OSAufc once to zero.

At the time t6, if the second oxygen storage amount OSAufc becomes a predetermined resumption reference amount Crefdwn or more, the electronic control unit 200 ends control for restoration of the storage amount and resumes normal control.

The electronic control unit 200 switches the air-fuel ratio correction amount AFC from the third lean correction amount AFCL3 to the first rich correction amount AFCR1 at the time of resumption of normal control. That is, the target air-fuel ratio is switched from the third lean air-fuel ratio AFL3 to the first rich air-fuel ratio AFR1. This is because after control for restoration of the storage amount, the first oxygen storage amount OSAsc becomes the maximum storage amount Cmaxup, so it is necessary to make the exhaust flowing into the first three-way catalyst 34 a rich air-fuel ratio and decrease the first oxygen storage amount OSAsc.

Note that lean air-fuel ratio exhaust present at the upstream side from the second three-way catalyst 35 flows into the second three-way catalyst 35 for a little while (period until the time t7) even after the target air-fuel ratio is switched to the first rich air-fuel ratio AFR1 at the time t6. For this reason, the resumption reference amount Crefdwn is made a value by which the second oxygen storage amount OSAufc will not reach the maximum storage amount Cmaxdwn even if all of the lean air-fuel ratio exhaust present in the exhaust passage flows into the second three-way catalyst 35.

Note that, the timing of ending control for restoration of the storage amount is not limited to when the second oxygen storage amount OSAufc becomes a predetermined resumption reference amount Crefdwn or more. For example, in the modification of the present embodiment, control for restoration of the storage amount is ended after the second oxygen storage amount OSAufc is restored to a certain extent and before the second oxygen storage amount OSAufc reaches the maximum storage amount Cmaxdwn. That is, in the modification of the present embodiment, the control for restoration of the storage amount is ended from when the output air-fuel ratio AFdwn of the third air-fuel ratio sensor 215 becomes the stoichiometric air-fuel ratio and the second oxygen storage amount OSAufc becomes a state restored to a certain extent to when the output air-fuel ratio AFdwn of the third air-fuel ratio sensor 215 becomes the lean judgment air-fuel ratio AFrefle or more.

Further, in another modification of the present embodiment, the electronic control unit 200 estimates the amount of oxygen in the lean air-fuel ratio exhaust present inside the exhaust passage at the upstream side from the second three-way catalyst 35 as needed based on for example the engine operating state and ends control for restoration of the storage amount and resumes normal control in the period until the sum of this estimated oxygen amount and estimated value of the second oxygen storage amount OSAufc becomes the maximum storage amount Cmaxdwn.

At the time t6 and on, the electronic control unit 200 performs rich failure control as control for setting the target air-fuel ratio until the output air-fuel ratio AFdwn of the third air-fuel ratio sensor 215 again becomes the rich judgment air-fuel ratio AFrefri or less.

In this regard, after the output air-fuel ratio AFmid of the second air-fuel ratio sensor 214 becomes the lean judgment air-fuel ratio AFrefle or more at the time t5, the $NO_X$ in the exhaust flowing into the first three-way catalyst 34 flows out from the first three-way catalyst 34 without being removed by reduction at the first three-way catalyst 34 and flows into the second three-way catalyst 35 as is.

For this reason, if maintaining the target air-fuel ratio at the large lean degree second lean air-fuel ratio AFL2 at the time t5 and on, a relatively large amount of $NO_X$ flows into the second three-way catalyst 35 at the time t5 and on. At the time t5, the second oxygen storage amount OSAufc is zero, so basically the $NO_X$ flowing into the second three-way catalyst 35 is removed by reduction by the second three-way catalyst 35. However, if a large amount of $NO_X$ flows into the second three-way catalyst 35, part of the $NO_X$ is liable to flow out from the second three-way catalyst 35 without being removed by reduction by the second three-way catalyst 35.

At this time, as in the control for restoration of the storage amount according to the present embodiment, by switching the target air-fuel ratio to the third lean air-fuel ratio AFL3 with a small lean degree after the output air-fuel ratio AFmid of the second air-fuel ratio sensor 214 becomes the lean judgment air-fuel ratio AFrefle or more, it is possible to keep a large amount of $NO_X$ from flowing into the second three-way catalyst 35. For this reason, it is possible to keep part of the $NO_X$ flowing into the second three-way catalyst 35 from flowing out from the second three-way catalyst 35 without being removed by reduction by the second three-way catalyst 35.

Further, in the present embodiment, when the estimated value of the second oxygen storage amount OSAufc becomes the resumption reference amount Crefdwn or more, control for restoration of the storage amount is made to end. For this reason, for example, if the estimated value and actual value of the second oxygen storage amount OSAufc end up being offset or otherwise lean air-fuel ratio exhaust containing $NO_X$ flows out from the first three-way catalyst 34, if for some reason or another the second oxygen storage amount OSAufc reaches the maximum storage amount Cmaxdwn to cause lean failure, a large amount of $NO_X$ is liable to temporarily flow out from the second three-way catalyst 35.

In this case as well, as in the control for restoration of the storage amount according to the present embodiment, by switching the target air-fuel ratio to the third lean air-fuel ratio AFL3 with a small lean degree after the output air-fuel ratio AFmid of the second air-fuel ratio sensor 214 becomes the lean judgment air-fuel ratio AFrefle or more, it is possible to keep down the amount of discharge of the $NO_X$ temporarily flowing out from the second three-way catalyst 35.

Flow Chart of Control for Setting Target Air-Fuel Ratio

Figure 8:
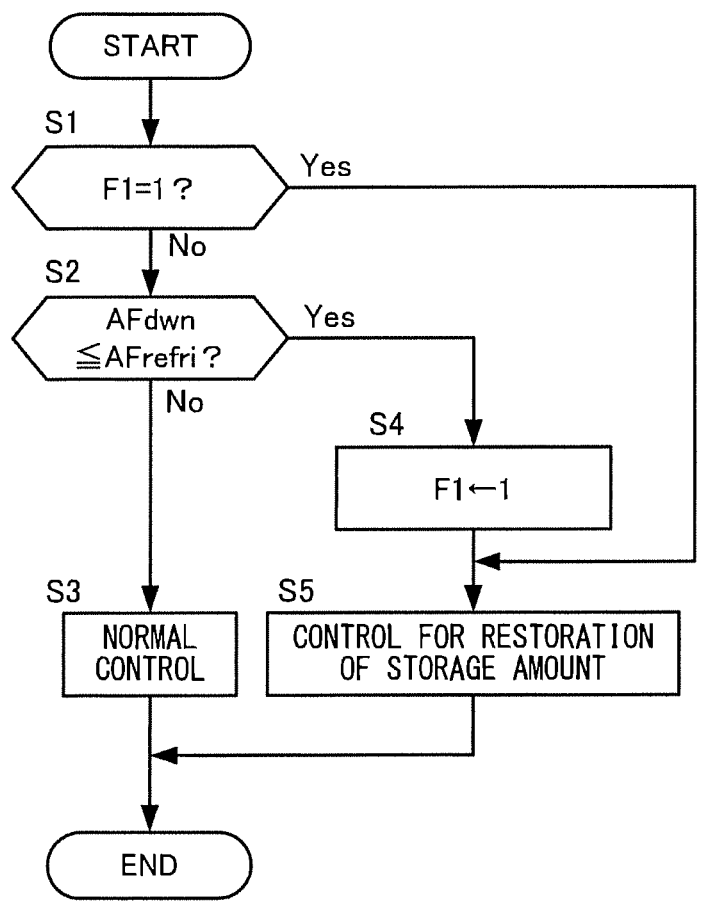
FIG. 8 is a flow chart explaining control for setting a target air-fuel ratio according to the first embodiment of the present invention.

FIG. 8 is a flow chart explaining control for setting the target air-fuel ratio according to the present embodiment. The electronic control unit 200 repeatedly performs the present routine during engine operation at a predetermined processing period.

At step S1, the electronic control unit 200 judges if the flag F1 is set to "1". The flag F1 is a flag set to "1" when performing control for restoration of the storage amount. The initial value is set to "0". The electronic control unit 200 proceeds to step S2 if the flag F1 is set to "0". On the other hand, the electronic control unit proceeds to step S5 if the flag F1 is set to "1".

At step S2, the electronic control unit 200 judges if rich air-fuel ratio exhaust (unburned gas) is flowing out from the second three-way catalyst 35. Specifically, the electronic control unit 200 judges if the output air-fuel ratio AFdwn of the third air-fuel ratio sensor 215 is the rich judgment air-fuel ratio AFrefri or less. The electronic control unit 200 proceeds to step S3 if the output air-fuel ratio AFdwn of the third air-fuel ratio sensor 215 is larger than the rich judgment air-fuel ratio AFrefri. On the other hand, the electronic control unit 200 proceeds to step S4 if the output air-fuel ratio AFdwn of the third air-fuel ratio sensor 215 is the rich judgment air-fuel ratio AFrefri or less.

At step S3, the electronic control unit 200 performs normal control as control for setting the target air-fuel ratio. In the present embodiment, the electronic control unit 200 performs rich failure control. The detailed content of processing of rich failure control will be explained later referring to FIG. 9.

At step S4, the electronic control unit 200 sets the flag F1 to "1".

At step S5, the electronic control unit 200 performs control for restoration of the storage amount as control for setting the target air-fuel ratio. The detailed content of the processing for the control for restoration of the storage amount will be explained later with reference to FIG. 10.

Flow Chart of Normal Control

Figure 9:
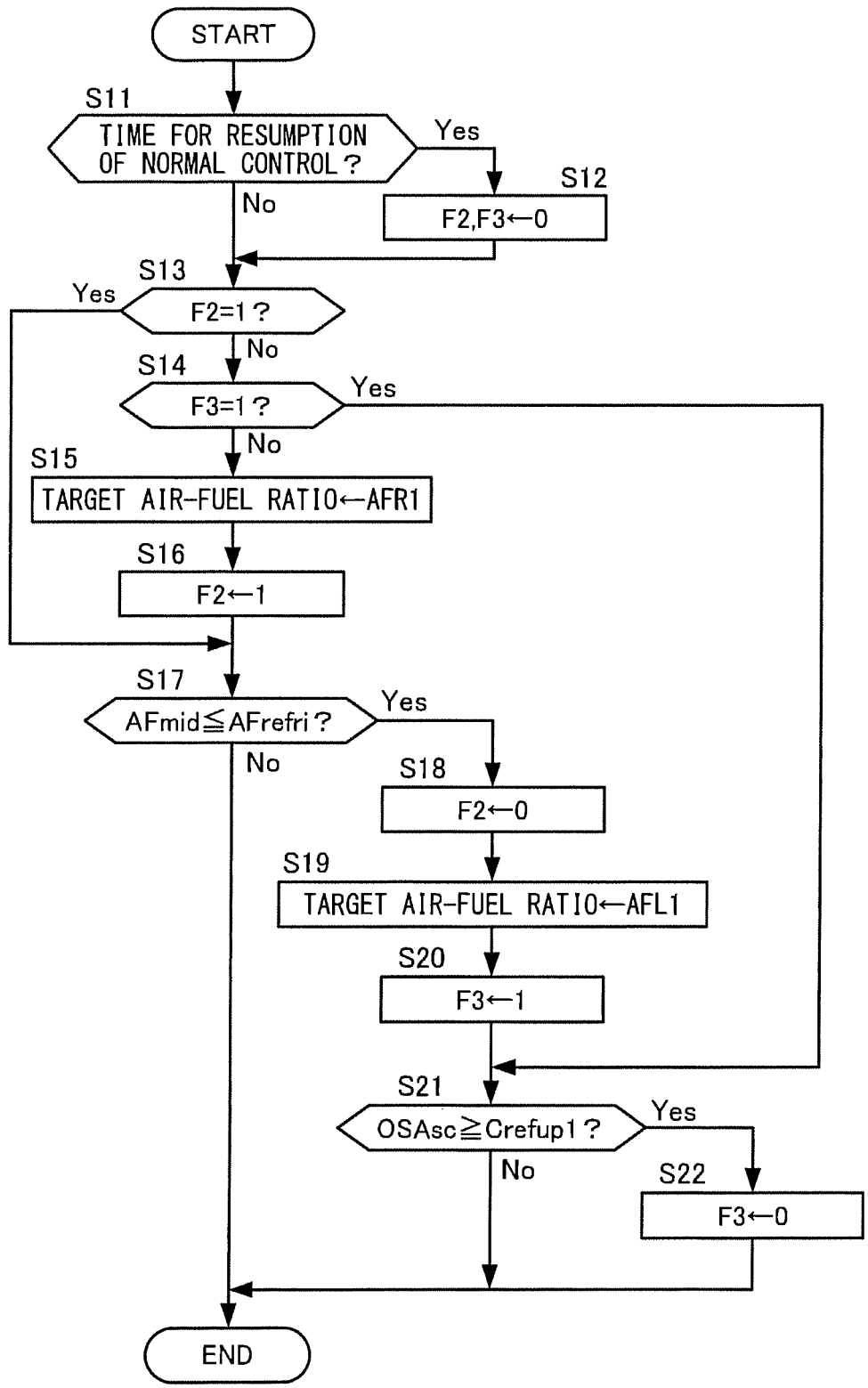
FIG. 9 is a flow chart explaining the detailed content of processing of rich failure control as normal control.

FIG. 9 is a flow chart explaining the detailed content of processing of rich failure control as normal control.

At step S11, the electronic control unit 200 judges if it is time for resumption of normal control after performing control for restoration of the storage amount. Specifically, the electronic control unit 200 judges if the flag F1 at the time of the previous processing was "1". The electronic control unit 200 proceeds to step S12 if it is time for resumption of normal control. On the other hand, the electronic control unit 200 proceeds to step S13 if it is not time for resumption of normal control.

At step S12, the electronic control unit 200 returns the flag F2 and flag F3 to "0". Note that the flag F2 is a flag set to "1" when, during normal control, the target air-fuel ratio is switched to the first rich air-fuel ratio AFR1. The initial value is set to "0". Further, the flag F3 is a flag set to "1" when, during normal control, the target air-fuel ratio is switched to the first lean air-fuel ratio AFL1. The initial value is set to "0".

At step S13, the electronic control unit 200 judges if the flag F2 is set to "1". The electronic control unit 200 proceeds to step S14 if the flag F2 is set to "0". On the other hand, the electronic control unit 200 proceeds to step S17 if the flag F2 is set to "1".

At step S14, the electronic control unit 200 judges if the flag F3 is set to "1". The electronic control unit 200 proceeds to step S15 if the flag F3 is set to "0". On the other hand, the electronic control unit 200 proceeds to step S21 if the flag F3 is set to "1".

At step S15, the electronic control unit 200 sets the target air-fuel ratio to the first rich air-fuel ratio AFR1.

At step S16, the electronic control unit 200 sets the flag F2 to "1".

At step S17, the electronic control unit 200 judges if the output air-fuel ratio AFmid of the second air-fuel ratio sensor 214 is the rich judgment air-fuel ratio AFrefri or less. The electronic control unit 200 ends the current processing if the output air-fuel ratio AFmid of the second air-fuel ratio sensor 214 becomes larger than the rich judgment air-fuel ratio AFrefri. On the other hand, the electronic control unit 200 proceeds to step S18 if the output air-fuel ratio AFmid of the second air-fuel ratio sensor 214 is the rich judgment air-fuel ratio AFrefri or less.

At step S18, the electronic control unit 200 returns the flag F2 to "0".

At step S19, the electronic control unit 200 sets the target air-fuel ratio to the first lean air-fuel ratio AFL1.

At step S20, the electronic control unit 200 sets the flag F3 to "1".

At step S21, the electronic control unit 200 reads the first oxygen storage amount OSAsc estimated by the control for estimating the first oxygen storage amount and judges if the first oxygen storage amount OSAsc is the first switching reference amount Crefup1 or more. The electronic control unit 200 ends the current processing if the first oxygen storage amount OSAsc is less than the first switching reference amount Crefup1. On the other hand, the electronic control unit 200 proceeds to step S22 if the first oxygen storage amount OSAsc is the first switching reference amount Crefup1 or more.

At step S22, the electronic control unit 200 returns the flag F3 to "0".

Figure 10:
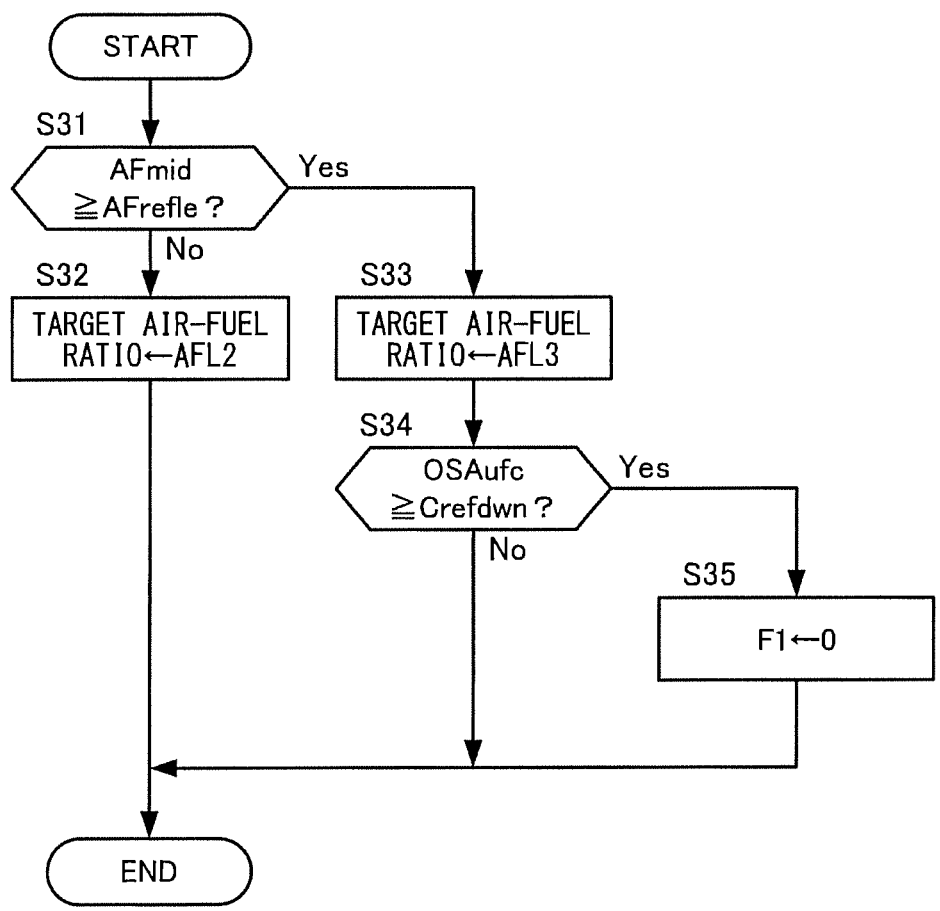
FIG. 10 is a flow chart explaining the detailed content of control for restoration of the storage amount according to the first embodiment of the present invention.

Flow Chart of Control for Restoration of Storage Amount According to First Embodiment FIG. 10 is a flow chart explaining the detailed content of processing of the control for restoration of the storage amount according to the present embodiment.

At step S31, the electronic control unit 200 judges if the output air-fuel ratio AFmid of the second air-fuel ratio sensor 214 is a lean judgment air-fuel ratio AFrefle or more. The electronic control unit 200 proceeds to step S32 if the output air-fuel ratio AFmid of the second air-fuel ratio sensor 214 is less than the lean judgment air-fuel ratio AFrefle. On the other hand, the electronic control unit 200 proceeds to step S33 if the output air-fuel ratio AFmid of the second air-fuel ratio sensor 214 is the lean judgment air-fuel ratio AFrefle or more.

At step S32, the electronic control unit 200 sets the target air-fuel ratio to a second lean air-fuel ratio AFL2.

At step S33, the electronic control unit 200 sets the target air-fuel ratio to a third lean air-fuel ratio AFL3.

At step S34, the electronic control unit 200 reads the second oxygen storage amount OSAufc estimated by the control for estimating the second oxygen storage amount and judges if the second oxygen storage amount OSAufc is the resumption reference amount Crefdwn or more. The electronic control unit 200 ends the current processing if the second oxygen storage amount OSAufc is less than the resumption reference value Crefdwn. In this case, the control for restoration of the storage amount continues to be performed. On the other hand, the electronic control unit 200 proceeds to step S35 if the second oxygen storage amount OSAufc is the resumption reference value Crefdwn or more.

At step S35, the electronic control unit 200 returns the flag F1 to "0" so as to end the control for restoration of the storage amount and resume normal control.

Action and Effect

According to the above explained present embodiment, an electronic control unit 200 (control device) for controlling the internal combustion engine 100 comprising an engine body 1, a first three-way catalyst 34 (first catalyst) arranged in the exhaust passage of the engine body 1 and having an oxygen storage ability, a second three-way catalyst 35 (second catalyst) arranged in the exhaust passage further at the downstream side in the direction of flow of exhaust from the first three-way catalyst 34 and having an oxygen storage ability, a first air-fuel ratio sensor 213 arranged in the exhaust passage further at the upstream side in the direction of flow of exhaust from the first three-way catalyst 34 and detecting the air-fuel ratio of the exhaust flowing into the first three-way catalyst 34, a second air-fuel ratio sensor 214 arranged in the exhaust passage between the first three-way catalyst 34 and second three-way catalyst 35 and detecting the air-fuel ratio of the exhaust flowing out from the first three-way catalyst 34, and a third air-fuel ratio sensor 215 arranged in the exhaust passage further at the downstream side in the direction of flow of exhaust from the second three-way catalyst 35 and detecting the air-fuel ratio of the exhaust flowing out from the second three-way catalyst 35, comprises an air-fuel ratio control part configured to control the air-fuel ratio of the exhaust discharged from the engine body 1 so that the output air-fuel ratio AFup of the first air-fuel ratio sensor 213 becomes the target air-fuel ratio and a target air-fuel ratio setting part configured to set a target air-fuel ratio.

The target air-fuel ratio setting part comprises a first setting control part configured to perform normal control alternately switching the target air-fuel ratio between a predetermined first lean air-fuel ratio AFL1 larger than the stoichiometric air-fuel ratio and a predetermined first rich air-fuel ratio AFR1 smaller than the stoichiometric air-fuel ratio and a second setting control part configured to perform control for restoration of the storage amount for stopping normal control and increasing the oxygen storage amount of the second three-way catalyst 35 when the output air-fuel ratio AFdwn of the third air-fuel ratio sensor 215 has become a predetermined rich judgment air-fuel ratio AFrefri smaller than the stoichiometric air-fuel ratio and larger than the first rich air-fuel ratio AFR1 or has become less.

Further, the second setting control part is configured to set the target air-fuel ratio at a predetermined second lean air-fuel ratio AFL2 larger than the first lean air-fuel ratio AFL1 at the time of start of the control for restoration of the storage amount and to set the target air-fuel ratio to a predetermined third lean air-fuel ratio AFL3 smaller than the second lean air-fuel ratio AFL2 after exhaust with a larger air-fuel ratio than the stoichiometric air-fuel ratio flows out from the first three-way catalyst 34 in the time period when setting the target air-fuel ratio to the second lean air-fuel ratio AFL2.

For this reason, at the time of control for restoration of the storage amount, the target air-fuel ratio is set to a second lean air-fuel ratio AFL2 larger than the first lean air-fuel ratio AFL1 set at the time of normal control at least until lean air-fuel ratio exhaust flows out from the first three-way catalyst 34. Therefore, compared with when setting the target air-fuel ratio to the first lean air-fuel ratio AFL1, it is possible to supply a large amount of oxygen to the first three-way catalyst 34, so it is possible to quickly increase the first oxygen storage amount OSAsc. Due to this, it is possible to make the first oxygen storage amount OSAsc increase to the maximum storage amount Cmaxup in a short time period to obtain a state where lean air-fuel ratio exhaust flows out from the first three-way catalyst 34, so it is possible to quickly supply oxygen to the second three-way catalyst 35.

Here, if maintaining the target air-fuel ratio as it is at a second lean air-fuel ratio AFL2 with a large lean degree even after lean air-fuel ratio exhaust flows out from the first three-way catalyst 34, a relatively large amount of $NO_X$ flows into the second three-way catalyst 35. For this reason, part of the $NO_X$ is liable to flow out from the second three-way catalyst 35 without being removed by reduction by the second three-way catalyst 35. Further, if for example the estimated value and actual value of the second oxygen storage amount OSAufc end up being offset or otherwise lean air-fuel ratio exhaust flows out from the first three-way catalyst 34, if for some reason or another the second three-way catalyst 35 ends up suffering from lean failure, a large amount of $NO_X$ is liable to temporarily flow out from the second three-way catalyst 35.

As opposed to this, according to the second setting control part according to the present embodiment, after lean air-fuel ratio exhaust flows out from the first three-way catalyst 34, the target air-fuel ratio is set to a third lean air-fuel ratio AFL3 smaller than the second lean air-fuel ratio AFL2. For this reason, it is possible to keep down the amount of $NO_X$ flowing into the second three-way catalyst 35, so it is possible to keep $NO_X$ from flowing out from the second three-way catalyst. In particular, in the present embodiment, the third lean air-fuel ratio AFL3 is made an air-fuel ratio smaller than the first lean air-fuel ratio AFL1. For this reason, it is possible to keep more $NO_X$ from flowing out from the second three-way catalyst 35. Further, even if the second three-way catalyst 35 suffers from lean failure, it is possible to keep down the amount of discharge of $NO_X$ temporarily flowing out from the second three-way catalyst 35.

Further, the second setting control part according to the present embodiment is further configured so as to cause control for restoration of the storage amount to end and cause normal control to resume in the period from when the output air-fuel ratio AFdwn of the third air-fuel ratio sensor 215 becomes the stoichiometric air-fuel ratio to when the output air-fuel ratio AFdwn of the third air-fuel ratio sensor 215 becomes a predetermined lean judgment air-fuel ratio AFrefle larger than the stoichiometric air-fuel ratio and smaller than the third lean air-fuel ratio AFL3 or becomes larger.

In particular, in the present embodiment, the electronic control unit 200 further comprises a second oxygen storage amount estimation part configured to estimat a second oxygen storage amount OSAufc of the oxygen storage amount of the second three-way catalyst 35. The second setting control part is configured to cause control for restoration of the storage amount to end and cause normal control to resume when the second oxygen storage amount OSAufc becomes a predetermined resumption reference amount Crefdwn smaller than the maximum storage amount Cmaxdwn of the second three-way catalyst 35.

Due to this, after lean air-fuel ratio exhaust flowing out from the first three-way catalyst 34 flows into the second three-way catalyst 35, control for restoration of the storage amount can be performed at least until the output air-fuel ratio AFdwn of the third air-fuel ratio sensor 215 becomes the stoichiometric air-fuel ratio and the second oxygen storage amount OSAufc becomes a state restored to a certain extent. For this reason, after normal control is resumed, even if rich air-fuel ratio exhaust containing unburned gas flows into the second three-way catalyst 35, the second three-way catalyst 35 may be used to reliably remove the unburned gas by oxidation. For this reason, it is possible to suppress outflow of rich air-fuel ratio exhaust containing unburned gas from the second three-way catalyst 35 and suppress deterioration of the exhaust emission.

Further, in a modification of the present embodiment, the electronic control unit 200 further comprises a second oxygen storage amount estimation part configured to estimate a second oxygen storage amount OSAufc of an oxygen storage amount of the second three-way catalyst 35 and an oxygen amount estimation part configured to estimate an amount of oxygen present in the exhaust passage at the upstream side in the direction of flow of exhaust from the front end face of the second three-way catalyst 35. The second setting control part is configured so as to cause the control for restoration of the storage amount to end and cause normal control to resume in the period until the sum of the second oxygen storage amount OSAufc and the oxygen amount becomes the maximum storage amount Cmaxdwn of the second three-way catalyst 35.

Due to this, after control for restoration of the storage amount, even if the lean air-fuel ratio exhaust present in the exhaust passage at the upstream side from the second three-way catalyst 35 flows into the second three-way catalyst 35, the second oxygen storage amount OSAufc will not reach the maximum storage amount Cmaxdwn. For this reason, it is possible to keep the lean air-fuel ratio exhaust containing $NO_X$ from flowing out from the second three-way catalyst 35.

Further, the electronic control unit 200 according to the present embodiment further comprises a first oxygen storage amount estimation part configured to estimate a first oxygen storage amount OSAsc of an oxygen storage amount of the first three-way catalyst 34. The first setting control part is configured to set the target air-fuel ratio to the first lean air-fuel ratio AFL1 when the output air-fuel ratio AFmid of the second air-fuel ratio sensor 214 becomes the rich judgment air-fuel ratio AFrefri or less and to set the target air-fuel ratio to the first rich air-fuel ratio AFL1 when the first oxygen storage amount OSAsc becomes a predetermined first switching reference amount Crefup1 smaller than the maximum storage amount Cmaxup of the first three-way catalyst 34 or becomes more in the time period when setting target air-fuel ratio to the first lean air-fuel ratio AFL1. That is, the first setting control part is configured so as to perform rich failure control as normal control.

In this way, by performing rich failure control as normal control, it is possible to constantly suppress the amount of discharge of $NO_X$ from the first three-way catalyst 34 and it is possible to make the amount of discharge of $NO_X$ from the first three-way catalyst 34 substantially zero. As a result, it is possible to make the amount of discharge of $NO_X$ from the second three-way catalyst 35 substantially zero.

Further, the first setting control part according to the present embodiment is further configured so as to set the target air-fuel ratio to the first rich air-fuel ratio AFR1 when resuming normal control.

Due to this, after control for restoration of the storage amount, the first oxygen storage amount OSAsc becomes the maximum storage amount Cmaxup, but at the start of normal control, it is possible to make the exhaust flowing into the first three-way catalyst 34 a rich air-fuel ratio, so it is possible to reduce the first oxygen storage amount OSAsc.

Second Embodiment

Next, a second embodiment of the present invention will be explained. The present embodiment differs in content of control for restoration of the storage amount from the first embodiment. Specifically, it differs from the first embodiment in the point of performing lean failure control during control for restoration of the storage amount to make the second oxygen storage amount OSAufc increase in stages. Below, this will be explained focusing on this point of difference.

In the above-mentioned first embodiment, after switching the target air-fuel ratio to the third lean air-fuel ratio AFL3, the target air-fuel ratio was maintained at the third lean air-fuel ratio AFL3 until the second oxygen storage amount OSAufc became the resumption reference amount Crefdwn or more. That is, in the above-mentioned first embodiment, to restore the oxygen storage amount of the second three-way catalyst 35, lean air-fuel ratio exhaust containing $NO_X$ was made to continuously flow into the second three-way catalyst 35. In the time period maintaining the target air-fuel ratio at the third lean air-fuel ratio AFL3, the second oxygen storage amount OSAufc is in a state sufficiently smaller than the maximum storage amount Cmaxdwn, so even if lean air-fuel ratio exhaust flows into the second three-way catalyst 35, basically the $NO_X$ is removed by reduction at the second three-way catalyst 35 and $NO_X$ will not flow out from the second three-way catalyst 35. However, if making lean air-fuel ratio exhaust containing $NO_X$ continuously flow into the second three-way catalyst 35, the possibility of $NO_X$ slipping through the second three-way catalyst 35 without being removed by reduction there is not zero.

Therefore, in the present embodiment, in restoring the oxygen storage amount of the second three-way catalyst 35, the lean air-fuel ratio exhaust was made to intermittently flow into the second three-way catalyst 35. Specifically, after the output air-fuel ratio AFdwn of the third air-fuel ratio sensor 215 becomes the stoichiometric air-fuel ratio, lean failure control is performed periodically making the first oxygen storage amount OSAsc the maximum storage amount Cmaxup to cause lean failure of the first three-way catalyst 34 so that lean air-fuel ratio exhaust intermittently flows into the second three-way catalyst 35. Below, the control for restoration of the storage amount according to the present embodiment will be explained.

Control for Restoration of Storage Amount According to Second Embodiment

Figure 11:
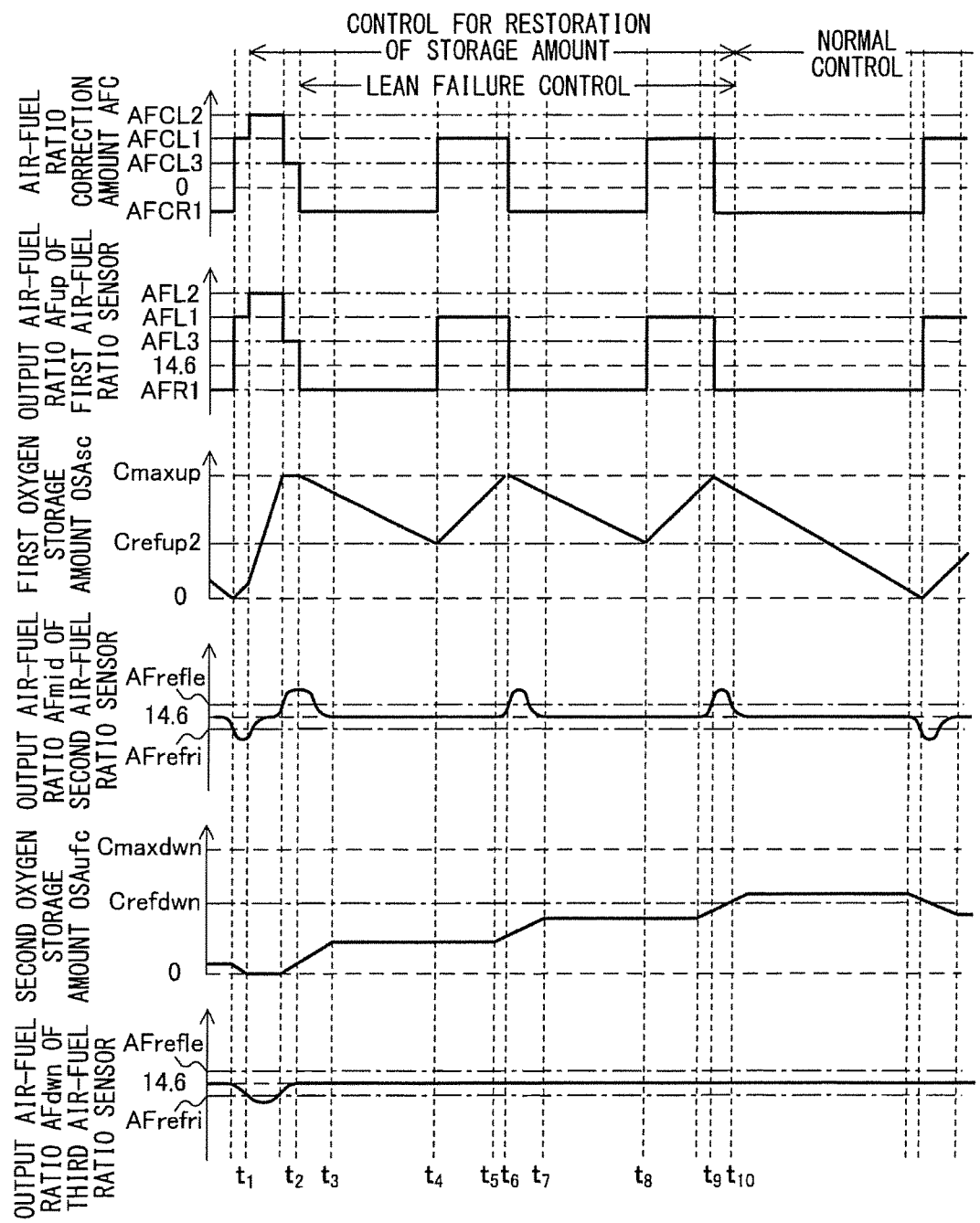
FIG. 11 is a time chart explaining the operation of control for restoration of the storage amount according to a second embodiment of the present invention.

FIG. 11 is a time chart explaining the operation of control for restoration of the storage amount according to the present embodiment.

The operation of the control for restoration of the storage amount from the time t1 to the time t2 is similar to the control for restoration of the storage amount of the above-mentioned first embodiment.

At the time t2, if the output air-fuel ratio AFdwn of the third air-fuel ratio sensor 215 becomes the stoichiometric air-fuel ratio, the electronic control unit 200 judges that unburned gas no longer flows out from the second three-way catalyst 35 and performs lean failure control as control for restoration of the storage amount. Specifically, the electronic control unit 200 switches the target air-fuel ratio from the third lean air-fuel ratio AFL3 to the first rich air-fuel ratio AFR1. Due to this, at the time t2 and on, the air-fuel ratio of the exhaust flowing into the first three-way catalyst 34 becomes the rich air-fuel ratio, so the first oxygen storage amount OSAsc decreases.

On the other hand, at the time t2, the target air-fuel ratio is switched to the first rich air-fuel ratio AFR1, but in actuality, there is a time lag until the rich air-fuel ratio exhaust flows downstream of the first three-way catalyst 34, so the output air-fuel ratio AFmid of the second air-fuel ratio sensor 214 still becomes larger than the stoichiometric air-fuel ratio. For this reason, at the time t2 and on as well, the second oxygen storage amount OSAufc increases. Further, at the time t3, if the output air-fuel ratio AFmid of the second air-fuel ratio sensor 214 converges to the stoichiometric air-fuel ratio, the second oxygen storage amount OSAufc no longer increases and is maintained constant.

At the time t4, if the first oxygen storage amount OSAsc falls to a predetermined second switching reference amount Crefup2, the electronic control unit 200 switches the target air-fuel ratio from the first rich air-fuel ratio AFR1 to the first lean air-fuel ratio AFL1. Due to this, at the time t4 and on, the air-fuel ratio of the exhaust flowing into the first three-way catalyst 34 becomes a lean air-fuel ratio, so the first oxygen storage amount OSAsc increases. Note that, in the present embodiment, when the first oxygen storage amount OSAsc falls to the predetermined second switching reference amount Crefup2, the target air-fuel ratio is switched to the first lean air-fuel ratio AFL1, but, at this time, the target air-fuel ratio is not limited to the first lean air-fuel ratio AFL1. For example, it may also be made the third lean air-fuel ratio AFL3.

Further, at the time t5, the first oxygen storage amount OSAsc approaches the maximum storage amount Cmaxup. Along with this, lean air-fuel ratio exhaust gradually starts to flow out from the first three-way catalyst 34. Due to this, at the time t5 and on, the output air-fuel ratio AFmid of the second air-fuel ratio sensor 214 gradually increases.

Further, at the time t6, if the output air-fuel ratio AFmid of the second air-fuel ratio sensor 214 increases to the lean judgment air-fuel ratio AFrefle, to make the first oxygen storage amount OSAsc decrease, the electronic control unit 200 again switches the target air-fuel ratio from the first lean air-fuel ratio AFL1 to the first rich air-fuel ratio AFR1. Due to this, at the time t7, the output air-fuel ratio AFmid of the second air-fuel ratio sensor 214 converges to the stoichiometric air-fuel ratio.

At this time, in the time period from the time 5 to the time t7, the output air-fuel ratio AFmid of the second air-fuel ratio sensor becomes larger than the stoichiometric air-fuel ratio and lean air-fuel ratio exhaust flows out from the first three-way catalyst 34. In other words, the lean air-fuel ratio exhaust flows into the second three-way catalyst 35. For this reason, in the time period from the time t5 to the time t7, the second oxygen storage amount OSAufc gradually increases. At the time t5, if the output air-fuel ratio AFmid of the second air-fuel ratio sensor 214 converges to the stoichiometric air-fuel ratio, the second oxygen storage amount OSAufc no longer increases and is maintained constant.

If performing lean failure control in this way, in the time period around when the target air-fuel ratio is switched from the first lean air-fuel ratio AFL1 to the first rich air-fuel ratio AFR1, lean air-fuel ratio exhaust temporarily flows out from the first three-way catalyst 34. For this reason, it is possible to intermittently make a lean air-fuel ratio exhaust flow into the second three-way catalyst 35 to make the second oxygen storage amount OSAufc increase a little at a time until the second oxygen storage amount OSAufc becomes the resumption reference amount Crefdwn or more.

At the time t8, if the first oxygen storage amount OSAsc falls down to a predetermined second switching reference amount Crefup2, the target air-fuel ratio is again switched to the first lean air-fuel ratio AFL1. At the time t9, if the output air-fuel ratio AFmid of the second air-fuel ratio sensor becomes the lean judgment air-fuel ratio AFrefle or more, the target air-fuel ratio is again switched to the first rich air-fuel ratio AFR1.

Further, at the time t10, if the second oxygen storage amount OSAufc becomes the resumption reference amount Crefdwn or more, the electronic control unit 200 ends the control for restoration of the storage amount and resumes normal control. Note that in the present embodiment as well, the timing for ending the control for restoration of the storage amount is not limited to when the second oxygen storage amount OSAufc becomes the predetermined resumption reference amount Crefdwn or more. As explained above, it is sufficient to restore the second oxygen storage amount OSAufc to a certain extent, then end the control for restoration of the storage amount before the second oxygen storage amount OSAufc reaches the maximum storage amount Cmaxdwn.

Further, in the time chart of FIG. 11, for convenience, the target air-fuel ratio in the lean failure control was set to the same target air-fuel ratio in normal control (first rich air-fuel ratio AFR1 and first lean air-fuel ratio AFL1), but it is also possible to set a target air-fuel ratio different from normal control (that is, any rich air-fuel ratio and lean air-fuel ratio).

Figure 12:
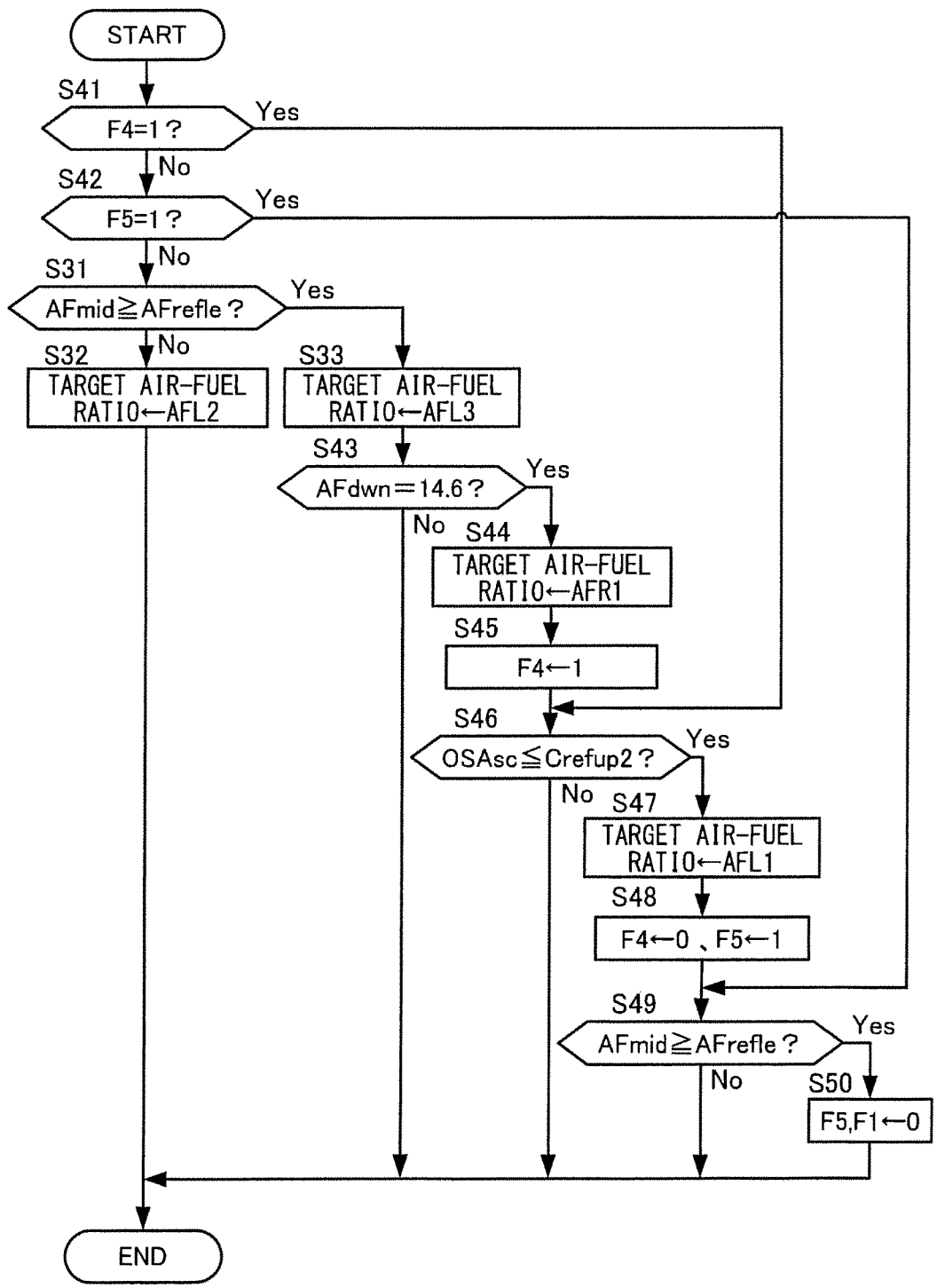
FIG. 12 is a flow chart explaining the detailed content of control for restoration of the storage amount according to the second embodiment of the present invention.

Flow Chart of Control for Restoration of Storage Amount According to Second Embodiment FIG. 12 is a flow chart explaining the detailed content of processing of the control for restoration of the storage amount according to the present embodiment.

The processing from step S31 to step S33 is similar to the first embodiment, so the explanation will be omitted here.

At step S41, the electronic control unit 200 judges if the flag F4 is set to "1". The flag F4 is a flag set to "1" when switching the target air-fuel ratio to the first rich air-fuel ratio AFR1 when performing lean failure control as control for restoration of the storage amount. The initial value is set to "0". The electronic control unit 200 proceeds to step S42 when the flag F4 is set to "0". On the other hand, the electronic control unit 200 proceeds to step S46 if the flag F4 is set to "1".

At step S42, the electronic control unit 200 judges if the flag F5 has been set to "1". The flag F5 is a flag set to "1" when switching the target air-fuel ratio to the first lean air-fuel ratio AFL1 when performing lean failure control as control for restoration of the storage amount. The initial value is set to "0". The electronic control unit 200 proceeds to step S31 if the flag F5 is set to "0". On the other hand, the electronic control unit 200 proceeds to step S50 if the flag F5 is set to "1".

At step S43, the electronic control unit 200 judges if the output air-fuel ratio AFdwn of the third air-fuel ratio sensor 215 has become the stoichiometric air-fuel ratio. The electronic control unit 200 ends the current processing if the output air-fuel ratio AFdwn of the third air-fuel ratio sensor 215 has not become the stoichiometric air-fuel ratio. In this case, the target air-fuel ratio is maintained at the third lean air-fuel ratio AFL3 until rich air-fuel ratio exhaust including unburned gas no longer flows out from the second three-way catalyst 35. On the other hand, the electronic control unit 200 proceeds to step S44 when the output air-fuel ratio AFdwn of the third air-fuel ratio sensor 215 has become the stoichiometric air-fuel ratio and it is judged that rich air-fuel ratio exhaust containing unburned gas no longer flows out from the second three-way catalyst 35.

At step S44, the electronic control unit 200 sets the target air-fuel ratio at the first rich air-fuel ratio AFR1 and starts lean failure control as control for restoration of the storage amount.

At step S45, the electronic control unit 200 sets the flag F4 at "1".

At step S46, the electronic control unit 200 judges if the first oxygen storage amount OSAsc has become the second switching reference amount Crefup2 or less. The electronic control unit 200 ends the current processing if the first oxygen storage amount OSAsc is larger than the second switching reference amount Crefup2. On the other hand, the electronic control unit 200 proceeds to step S47 if the first oxygen storage amount OSAsc is the second switching reference amount Crefup2 or less.

At step S47, the electronic control unit 200 sets the target air-fuel ratio to the first lean air-fuel ratio AFL1.

At step S48, the electronic control unit 200 returns the flag F4 to "0" and sets the flag F5 to "1".

At step S49, the electronic control unit 200 judges if the output air-fuel ratio AFmid of the second air-fuel ratio sensor 214 is the lean judgment air-fuel ratio AFrefle or more. The electronic control unit 200 ends the current processing if the output air-fuel ratio AFmid of the second air-fuel ratio sensor 214 is less than the lean judgment air-fuel ratio AFrefle. On the other hand, the electronic control unit 200 proceeds to step S50 if the output air-fuel ratio AFmid of the second air-fuel ratio sensor 214 is the lean judgment air-fuel ratio AFrefle or more.

At step S50, the electronic control unit 200 returns the flag F5 and flag F1 to "0".

Action and Effect

According to the above explained present embodiment, the second setting control part of the electronic control unit 200 is configured to set the target air-fuel ratio to any rich air-fuel ratio (in the present embodiment, the first rich air-fuel ratio AFR1) when the output air-fuel ratio AFdwn of the third air-fuel ratio sensor 215 becomes the stoichiometric air-fuel ratio in the time period when setting the target air-fuel ratio to the third lean air-fuel ratio.

Further, the second setting control part is configured to set the target air-fuel ratio to any lean air-fuel ratio (in the present embodiment, the first lean air-fuel ratio AFL1) when the first oxygen storage amount OSAsc becomes a predetermined second switching reference amount Crefup2 larger than zero or becomes less in the time period when setting the target air-fuel ratio to any rich air-fuel ratio and to set the target air-fuel ratio to any rich air-fuel ratio when the output air-fuel ratio of the second air-fuel ratio sensor becomes the lean judgment air-fuel ratio AFrefle or more in the time period when setting the target air-fuel ratio to any lean air-fuel ratio. That is, the second setting control part according to the present embodiment is configured to perform lean failure control as control for restoration of the storage amount after the output air-fuel ratio AFdwn of the third air-fuel ratio sensor 215 becomes the stoichiometric air-fuel ratio.

Due to this, it is possible to make lean air-fuel ratio exhaust containing $NO_X$ flow into the second three-way catalyst 35 intermittently a little at a time and restore the second oxygen storage amount OSAufc in stages a little at a time. For this reason, it is possible to reliably remove by reduction the $NO_X$ contained in the lean air-fuel ratio exhaust by the second three-way catalyst 35.

Above, embodiments of the present invention were explained, but the above embodiments only show part of the applied examples of the present invention and do not limit the technical scope of the present invention to the specific configurations of the embodiments.

For example in the above embodiments, as normal control for alternately switching the target air-fuel ratio between the first lean air-fuel ratio AFL1 and the first rich air-fuel ratio AFR1, the example of performing rich failure control was explained. However, such normal control is not limited to rich failure control. For example, as normal control, it is also possible to perform the above-mentioned lean failure control (control periodically making the first oxygen storage amount OSAsc the maximum storage amount Cmaxup to cause lean failure of the first three-way catalyst 34), then perform control for restoration of the storage amount when the output air-fuel ratio AFdwn of the third air-fuel ratio sensor 215 has become the rich judgment air-fuel ratio AFrefri or less.

Note that when performing lean failure control as normal control, when the target air-fuel ratio is switched to the first rich air-fuel ratio AFR1, then the first oxygen storage amount OSAsc becomes the second switching reference amount Crefup or less, the target air-fuel ratio is switched to the first lean air-fuel ratio AFL1. For this reason, it is possible to constantly suppress outflow of unburned gas from the first three-way catalyst 34. Basically, it is possible to make the amount of discharge of unburned gas from the first three-way catalyst 34 substantially zero. Therefore, basically, unburned gas will not flow out from the second three-way catalyst 35, but due to some sort of reason, unburned gas may flow out from the second three-way catalyst 35. In this case, by performing control for restoration of the storage amount, it is possible to suppress the amount of discharge of unburned gas from the second three-way catalyst 35.

Further, as the normal control, it is possible to perform dual failure control causing lean breakdown and causing rich breakdown of the first three-way catalyst 34, then perform control for restoration of the storage amount when the output air-fuel ratio AFdwn of the third air-fuel ratio sensor 215 becomes the rich judgment air-fuel ratio AFrefri or less. "Dual failure control" is control switching the target air-fuel ratio to the first lean air-fuel ratio AFL1 when the output air-fuel ratio AFmid of the second air-fuel ratio sensor 214 becomes the rich judgment air-fuel ratio AFrefri or less in the time period when setting the target air-fuel ratio to the first rich air-fuel ratio AFR1 and switching the target air-fuel ratio to the first rich air-fuel ratio AFR1 when the output air-fuel ratio AFmid of the second air-fuel ratio sensor 214 becomes the lean judgment air-fuel ratio AFrefle or more in the time period when setting the target air-fuel ratio to the first lean air-fuel ratio AFL1.

When performing dual failure control as normal control, rich air-fuel ratio exhaust flows out from the first three-way catalyst 34 in the time period around when switching the target air-fuel ratio from the first rich air-fuel ratio AFR1 to the first lean air-fuel ratio AFL1. Further, lean air-fuel ratio exhaust flows out from the first three-way catalyst 34 in the time period around when switching the target air-fuel ratio from the first lean air-fuel ratio AFL1 to the first rich air-fuel ratio AFR1. For this reason, periodically, rich air-fuel ratio exhaust and lean air-fuel ratio exhaust flow into the second three-way catalyst 35, so basically, the second oxygen storage amount OSAufc is maintained constant. When the second oxygen storage amount OSAufc becomes zero, unburned gas will not flow out from the second three-way catalyst 35. However, for some reason or another, unburned gas may flow out from the second three-way catalyst 35. In such a case, by performing control for restoration of the storage amount, it is possible to suppress the amount of discharge of unburned gas from the second three-way catalyst 35.

Further, in the above embodiments, the first oxygen storage amount OSAsc was estimated based on the output air-fuel ratio AFup of the first air-fuel ratio sensor 213 etc. while the second oxygen storage amount OSAufc was estimated based on the output air-fuel ratio AFmid of the second air-fuel ratio sensor 214 etc. However, the first oxygen storage amount OSAsc and second oxygen storage amount OSAufc may be calculated based on other parameters besides these parameters and may be estimated based on parameters different from these parameters.

The invention claimed is:
1. A control device for an internal combustion engine for controlling an internal combustion engine provided with:
   an engine body;
   a first catalyst arranged in an exhaust passage of the engine body and having an oxygen storage ability;

a second catalyst arranged in the exhaust passage at the further downstream side in the direction of flow of exhaust from the first catalyst and having an oxygen storage ability;

a first air-fuel ratio sensor arranged in the exhaust passage at the further upstream side in the direction of flow of exhaust from the first catalyst for detecting an air-fuel ratio of the exhaust flowing into the first catalyst;

a second air-fuel ratio sensor arranged in the exhaust passage between the first catalyst and the second catalyst for detecting an air-fuel ratio of the exhaust flowing out from the first catalyst; and a third air-fuel ratio sensor arranged in the exhaust passage at a further downstream side in the direction of flow of exhaust of the second catalyst for detecting an air-fuel ratio of the exhaust flowing out from the second catalyst, the control device comprising:

an air-fuel ratio control part configured to control an air-fuel ratio of the exhaust discharged from the engine body so that the output air-fuel ratio of the first air-fuel ratio sensor becomes a target air-fuel ratio; and a target air-fuel ratio setting part configured to set the target air-fuel ratio, the target air-fuel ratio setting part comprising:

a first setting control part configured to perform normal control alternately switching the target air-fuel ratio between a predetermined first lean air-fuel ratio larger than a stoichiometric air-fuel ratio and a predetermined first rich air-fuel ratio smaller than the stoichiometric air-fuel ratio; and a second setting control part configured to perform control for restoration of the storage amount stopping the normal control and increasing the oxygen storage amount of the second catalyst when the output air-fuel ratio of the third air-fuel ratio sensor becomes a predetermined rich judgment air-fuel ratio smaller than the stoichiometric air-fuel ratio and larger than the first rich air-fuel ratio or becomes less, the second setting control part:

configured to set the target air-fuel ratio at a predetermined second lean air-fuel ratio larger than the first lean air-fuel ratio when starting the control for restoration of the storage amount; and configured to set the target air-fuel ratio to a predetermined third lean air-fuel ratio smaller than the second lean air-fuel ratio after exhaust larger in air-fuel ratio than the stoichiometric air-fuel ratio flows out from the first catalyst in the time period when setting the target air-fuel ratio to the second lean air-fuel ratio.

2. The control device for an internal combustion engine according to claim 1, wherein the third lean air-fuel ratio is smaller than the first lean air-fuel ratio.

3. The control device for an internal combustion engine according to claim 1, wherein the second setting control part is configured so as to end the control for restoration of the storage amount and resume the normal control in the period from when the output air-fuel ratio of the third air-fuel ratio sensor becomes the stoichiometric air-fuel ratio to when the output air-fuel ratio of the third air-fuel ratio sensor becomes a predetermined lean judgment air-fuel ratio larger than the stoichiometric air-fuel ratio and smaller than the third lean air-fuel ratio or becomes more.

4. The control device for an internal combustion engine according to claim 3, wherein the control device further comprises a second oxygen storage amount estimation part configured to estimate a second oxygen storage amount of the oxygen storage amount of the second catalyst, and the second setting control part is configured to end the control for restoration of the storage amount and resume the normal control when the second oxygen storage amount has become a predetermined resumption reference amount smaller than the maximum storage amount of the second catalyst.

5. The control device for an internal combustion engine according to claim 3, wherein the device further comprises:

a second oxygen storage amount estimation part configured to estimate a second oxygen storage amount of the oxygen storage amount of the second catalyst; and an oxygen amount estimation part configured to estimate the amount of oxygen present inside the exhaust passage at the upstream side in the direction of flow of exhaust from the front end face of the second catalyst, and the second setting control part is configured to end the storage amount restoration and setting control and resume the normal control while the sum of the second oxygen storage amount and the oxygen amount has become the maximum storage amount of the second catalyst.

6. The control device for an internal combustion engine according to claim 1, wherein the control device further comprises a first oxygen storage amount estimation part configured to estimate a first oxygen storage amount of an oxygen storage amount of the first catalyst, and the first setting control part:

is configured to set the target air-fuel ratio to the first lean air-fuel ratio when the output air-fuel ratio of the second air-fuel ratio sensor becomes the rich judgment air-fuel ratio or less; and is configured to set the target air-fuel ratio to the first rich air-fuel ratio when the first oxygen storage amount becomes a predetermined switching reference amount smaller than the maximum storage amount of the first catalyst or becomes more.

7. The control device for an internal combustion engine according to claim 1, wherein the control device further comprises a first oxygen storage amount estimation part configured to estimate a first oxygen storage amount of the oxygen storage amount of the first catalyst, and the second setting control part is configured:

to set the target air-fuel ratio to any rich air-fuel ratio when the output air-fuel ratio of the third air-fuel ratio sensor has become the stoichiometric air-fuel ratio in the time period when setting the target air-fuel ratio to the third lean air-fuel ratio;

to set the target air-fuel ratio to any lean air-fuel ratio when the first oxygen storage amount has become a predetermined second switching reference amount greater than zero or has become less in the time period when setting the target air-fuel ratio to any rich air-fuel ratio; and to set the target air-fuel ratio to any rich air-fuel ratio when the output air-fuel ratio of the second air-fuel ratio sensor has become a predetermined lean judgment air-fuel ratio larger than the stoichiometric air-fuel ratio and smaller than the third lean air-fuel ratio or has become more in the time period when setting the target air-fuel ratio to any lean air-fuel ratio.

8. The control device for an internal combustion engine according to claim 7, wherein
the first setting control part:
is configured to set the target air-fuel ratio to the first lean air-fuel ratio when the output air-fuel ratio of the second air-fuel ratio sensor becomes the rich judgment air-fuel ratio or less; and
is configured to set the target air-fuel ratio to the first rich air-fuel ratio when the first oxygen storage amount has become a predetermined switching reference amount smaller than the maximum storage amount of the first catalyst or has become more.

9. The control device for an internal combustion engine according to claim 1, wherein
the first setting control part is configured to set the target air-fuel ratio to the first rich air-fuel ratio when resuming the normal control.

* * * * *